US008433057B2

(12) United States Patent
Tashiro

(10) Patent No.: US 8,433,057 B2
(45) Date of Patent: Apr. 30, 2013

(54) VOICE BAND EXTENDER SEPARATELY EXTENDING FREQUENCY BANDS OF AN EXTRACTED-NOISE SIGNAL AND A NOISE-SUPPRESSED SIGNAL

(75) Inventor: Atsushi Tashiro, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 467 days.

(21) Appl. No.: 12/805,556

(22) Filed: Aug. 5, 2010

(65) Prior Publication Data

US 2011/0075832 A1 Mar. 31, 2011

(30) Foreign Application Priority Data

Sep. 29, 2009 (JP) ................................ 2009-225572

(51) Int. Cl.
*H04M 1/00* (2006.01)

(52) U.S. Cl.
USPC ................................ 379/392.01; 379/388.02

(58) Field of Classification Search ............ 379/388.01, 379/388.02, 392.01, 392
See application file for complete search history.

(56) References Cited

U.S. PATENT DOCUMENTS

| | | | | |
|---|---|---|---|---|
| 8,194,851 | B2 * | 6/2012 | Sakuraba et al. | 379/406.06 |
| 2008/0219434 | A1 * | 9/2008 | Liu et al. | 379/406.08 |
| 2009/0046847 | A1 * | 2/2009 | Wu et al. | 379/406.01 |

FOREIGN PATENT DOCUMENTS

JP 2003-256000 A 9/2003

* cited by examiner

*Primary Examiner* — Olisa Anwah
(74) *Attorney, Agent, or Firm* — Rabin & Berdo, P.C.

(57) ABSTRACT

A voice band extender includes a component separator for receiving a band-limited speech signal over a telecommunications line to separate the speech signal into a noise-suppressed signal and an extracted-noise signal, a noise-suppressed signal component extender for adding a signal having its frequency band higher than that of the noise-suppressed signal to thereby produce an extended noise-suppressed signal, an extracted-noise signal component extender for producing an extended extracted-noise signal, a signal intensity adjuster for adjusting signal intensity of either or both of the extended noise-suppressed signal and the extended extracted-noise signal, and a synthesizer for combining the extended noise-suppressed signal and the extended extracted-noise signal obtained by the intensity adjustment. The respective frequency bands of the extracted-noise signal and the noise-suppressed signal are thus extended.

10 Claims, 15 Drawing Sheets

VOICE BAND EXTENDER SEPARATELY EXTENDING FREQUENCY BANDS OF AN EXTRACTED-NOISE SIGNAL AND A NOISE-SUPPRESSED SIGNAL

BACKGROUND OF THE INVENTION

1. Field of the Invention

The present invention relates to a voice band extender and more in particular to a voice band extender for extending the frequency band of a band-limited speech signal by adding a signal having its frequency band higher than that of the speech signal.

2. Description of the Background Art

Telephone communication systems conveying speech signals have the frequency band thereof ranging from 0.3 to 3.4 kHz, which is so much narrower than the frequency range of genuine human voices. Therefore, the voice sounds or talker's voice transmitted over telephone systems are somewhat deteriorated to the level of muffled voice, bringing the strangeness of the talker's true voice to a listener.

Japanese patent laid-open publication No. 2003-256000 to Tokuda et al., discloses a telephone terminal unit, which includes a sound signal receiver for receiving a speech signal having its frequency band narrower than that of the true voice sound of a talker over a transmission line of, e.g. a telephone network. The telephone terminal unit also includes a first voice band extending section for shifting the frequency of the narrow band speech signal received by the sound signal receiver to a voiced sound frequency band, a second voice band extending section for shifting the frequency of the narrow band speech signal to an unvoiced sound frequency band, and a third voice band extending section for virtually restoring the low-frequency component of a voice sound lost due to limiting the frequency band of the speech signal. The signals produced by those voice band extending sections are in turn combined with each other to thereby extend the narrow-band of the speech signal to a higher frequency band to produce a speech sound having its bandwidth virtually expanded on the loudspeaker of the telephone handset, thus improving the sound quality of speech signals.

However, a speech signal which the conventional telephone terminal unit receives contains speech signal components of the voice sound of a talker to be extended in the form of non-noise and noise-suppressed signal components, as well as other signal components in the form of noise and extracted-noise components. Thus, the first, second and third voice band extending sections disclosed by Tokuda et al., are adapted to extend an original speech signal with the noise components causing abnormal and harsh sounds still contained therein. The conventional telephone terminal unit combines such extended speech signals just as they are, resulting in deterioration in quality of voice sound produced from the loudspeaker of the telephone handset.

SUMMARY OF THE INVENTION

It is an object of the present invention to provide a voice band extender capable of minimizing an unpleasant noise heard from the loudspeaker of a telephone handset with the clearness of a voice sound output increased.

In a voice band extender in accordance with the present invention, a band-limited speech signal received from a distal end talker over a telecommunications network is separated into an extracted-noise signal and a noise-suppressed signal, and then the respective frequency bands of the extracted-noise signal and the noise-suppressed signal are separately extended.

More specifically in accordance with the present invention, a voice band extender for receiving a band-limited speech signal through a telecommunications line to extend a frequency band of the speech signal includes a component separator for separating the speech signal into a noise-suppressed signal and an extracted-noise signal; a noise-suppressed signal component extender for adding to the noise-suppressed signal a signal having a frequency band higher than that of the noise-suppressed signal to produce an extended noise-suppressed signal; an extracted-noise signal component extender for adding to the extracted-noise signal a signal having a frequency band higher than that of the extracted-noise signal to produce an extended extracted-noise signal; a signal intensity adjuster for adjusting signal intensity of either or both of the extended noise-suppressed signal and the extended extracted-noise signal; and a synthesizer for combining the extended noise-suppressed signal and the extended extracted-noise signal with each other after the signal intensity adjustment.

Further, in accordance with the present invention, there is provided a voice band extension program, when installed and executed on a computer, for controlling the computer to serve as a voice band extender that receives a band-limited speech signal over a telecommunications line to extend a frequency band of the speech signal to act as a component separator for separating the speech signal into a noise-suppressed signal and an extracted-noise signal; a noise-suppressed signal component extender for adding to the noise-suppressed signal a signal having a frequency band higher than that of the noise-suppressed signal to produce an extended noise-suppressed signal; an extracted-noise signal component extender for adding to the extracted-noise signal a signal having a frequency band higher than that of the extracted-noise signal to produce an extended extracted-noise signal; a signal intensity adjuster for adjusting signal intensity of either or both of the extended noise-suppressed signal and the extended extracted-noise signal; and a synthesizer for combining the extended noise-suppressed signal and the extended extracted-noise signal with each other adjusted by the signal intensity adjuster.

In accordance with the present invention, a speech signal is separated into a noise-suppressed signal and an extracted-noise signal, of which the frequency bands are extended respectively, and then an extended noise-suppressed signal obtained by the extension of the frequency band of the noise-suppressed signal is adjusted in signal intensity. The signal intensity of an extended extracted-noise signal obtained by the extension of the frequency band of the extracted-noise signal can be thus reduced, resulting in an unpleasant noise suppressed and the clearness of a voice sound output from a loudspeaker improved.

Also in accordance with the present invention, to the received speech signal added is a signal having its frequency band higher than the frequency band of the speech signal, i.e. from 0.3 to 3.4 kHz, so that it is possible to reproduce and provide the content of utterance with a voice sound whose frequency band is extended to the range easily audible to listeners, even such as elderly people or small children.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
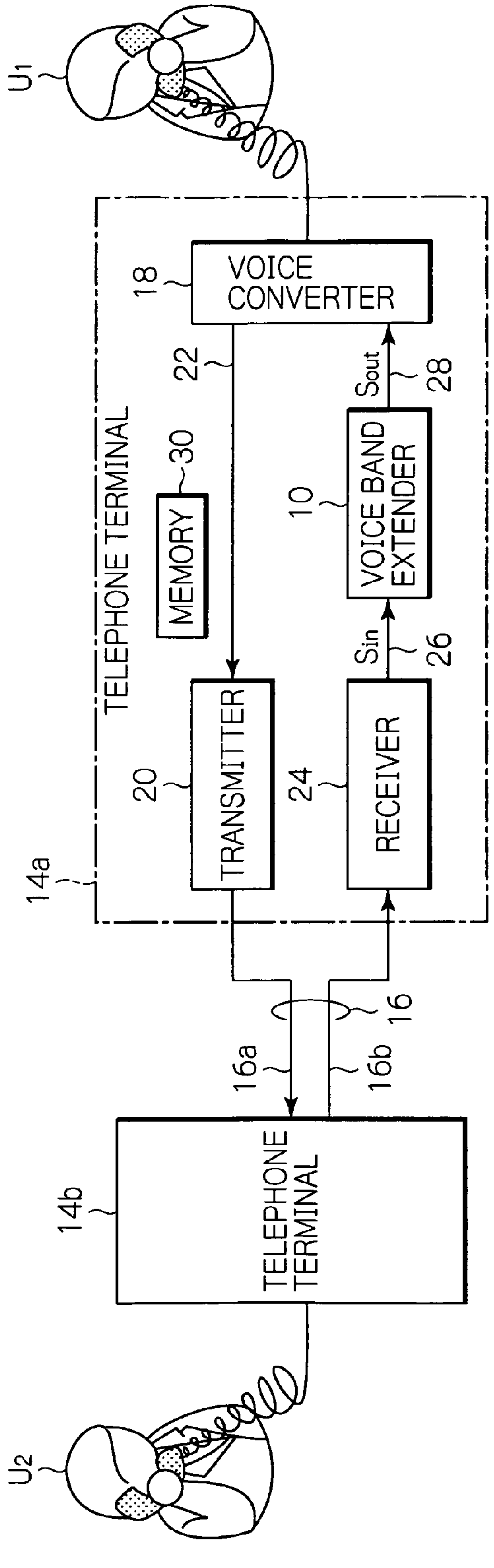
FIG. 1 is a schematic block diagram showing a communication system including a voice band extender according to a preferred embodiment.

Now, a preferred embodiment of a voice band extender will be described in detail with reference to the accompanying drawings. FIG. 1 shows the embodiment of the voice band extender for use in a telecommunications system 12, in which communication is established between users $U_1$ and $U_2$ over the telecommunications system 12. The telecommunications system 12, implemented as a telephone network system, includes telephone terminal units 14*a* and 14*b*, generally 14, which may be used by respective users $U_1$ and $U_2$. The telephone terminal units 14*a* and 14*b* may be connected to each other over a telecommunications network 16, which may be implemented by, e.g. telephone lines, a PSTN (Public-SwitchedTelephoneNetwork), the Internet or an IP (Internet Protocol) network. Over the telecommunications system 12, voice data are transmitted between the terminal units 14*a* and 14*b*, when connected to each other. Although FIG. 1 show only two telephone terminal units, there may of course be a lot of such terminal units connected to the telecommunications network 16.

The telephone terminal units 14*a* and 14*b* may be the same in structure as each other, and therefore may sometimes be generally designated with a reference numeral "14". Description will be made simply on one of the terminal units 14*a* and 14*b*. For example, the telephone terminal unit 14*a*, of which the internal structure is specifically depicted in the figure, includes a voice converter 18 for receiving spoken voice signals from, and outputting sound signals to, the user $U_1$. The voice converter 18 has its output 22 connected to a transmitter 20 for transmitting the voice data of the spoken voice signals 22 of the user $U_1$ to the communications network 16. Thus, signals are designated with reference numerals of connections on which they are conveyed.

The telephone terminal unit 14 further includes a receiver 24 for receiving an input speech signal transmitted over the telephone line 16*b*, which represents the voice data of spoken voice signal $S_{in}$ of the distal end user, or talker, $U_2$. The receiver 24 has its output 26 connected to a voice band extender 10. The voice band extender 10 is adapted to perform signal processing such as band extension, on the voice data $S_{in}$ so as to enhance the quality of the voice signal output from the voice converter 18 to the proximal end user, or listener, $U_1$. The resultant band-extended speech signal $S_{out}$ is output on a connection 28 to an input 28 of the voice converter 18.

The telephone terminal units 14 may partially or entirely be implemented by a general-purpose computer on which program sequences are installed and perform, when executed, the functions of the transmitter 20, receiver 24 and extender 10. Such a computer may include a CPU (Central Processing Unit), not shown in the figure, and a memory 30 which may be at least one of a ROM (Read Only Memory), a RAM (Random Access Memory) and a HDD (Hart Disc Drive). The memory 30 may be arranged anywhere in the telephone terminal unit 14 and adapted to store the program sequences.

The illustrative embodiment is depicted and described as configured by separate functional blocks. It is however to be noted that such a depiction and a description do not restrict the embodiment to an implementation only in the form of hardware. That may also be the case with alternative embodiments which will be described below. In this connection, the word "circuit" may be understood not only as hardware, such as an electronics circuit, but also as a function that may be implemented by software installed and executed on a computer.

Now, reference will be made to FIG. 2, which is a schematic block diagram showing the internal configuration of the voice band extender 10. The voice band extender 10 is configured to at first separate the input speech signal $S_{in}$, supplied from the receiver 24, into a noise-suppressed signal SS and an extracted-noise signal NS to extend the frequency component of each signal thus separated, thereafter adjust the intensity or strength of resultant noise-suppressed signal $SS_2$ and extracted-noise signal $NS_2$ thus extended, and synthesize resultant noise-suppressed signal $SS_3$ and extracted-noise signal $NS_3$ thus adjusted in intensity to thereby output a band-extended speech signal $S_{out}$ to the voice converter 18, FIG. 1. The memory 30 may be included in the voice band extender 10.

Figure 2:
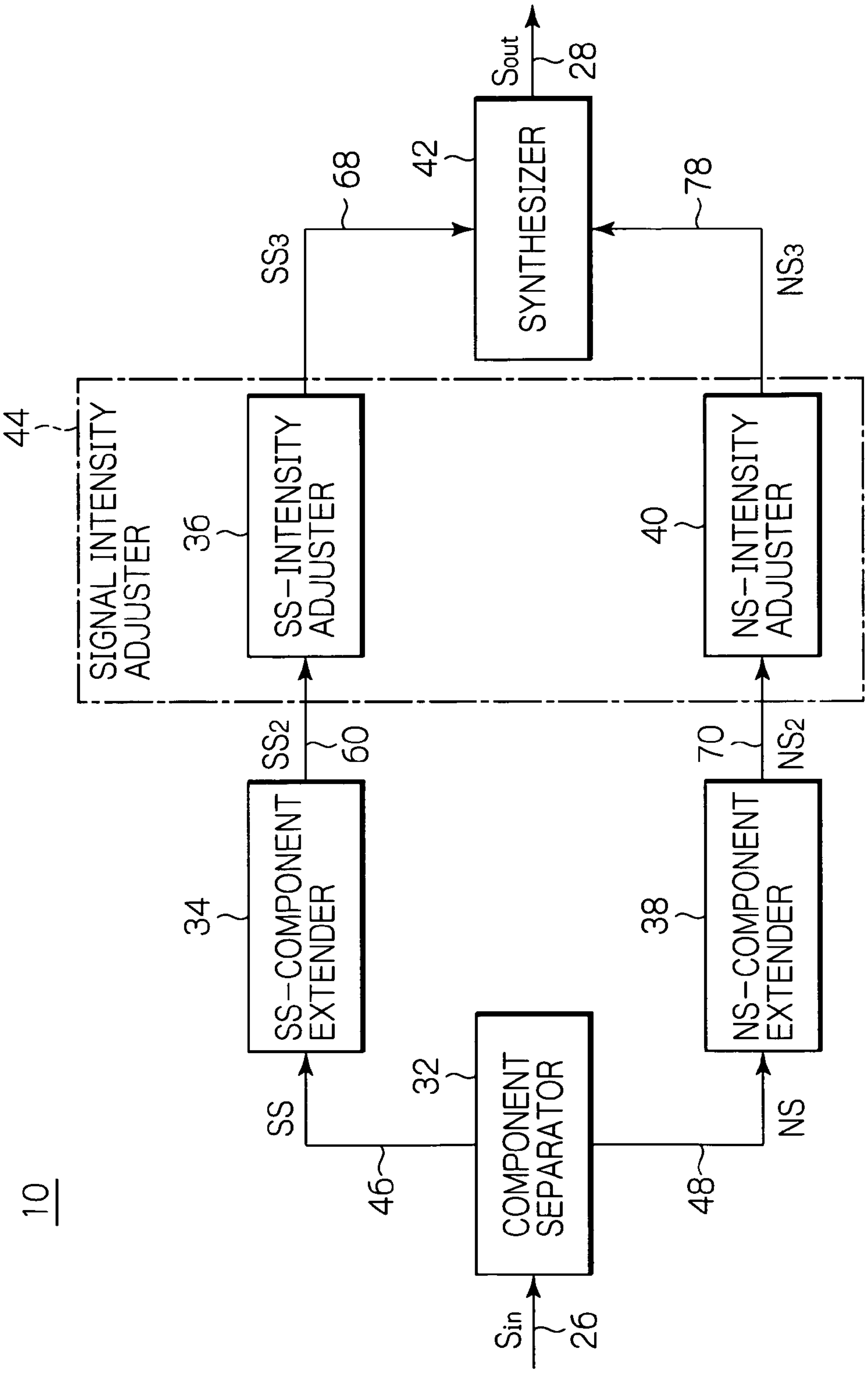
FIG. 2 is a schematic block diagram showing the internal configuration of the voice band extender according to the preferred embodiment shown in FIG. 1.

As shown in FIG. 2, the voice band extender 10 comprises a component separator 32 for separating the signal $S_{in}$, a noise-suppressed signal component extender (SS-component extender) 34 for extending the signal SS, a noise-suppressed signal intensity adjuster (SS-intensity adjuster) 36 for adjusting the signal $SS_2$, an extracted-noise signal component extender (NS-component extender) 38 for extending the signal NS, an extracted-noise signal intensity adjuster (NS-intensity adjuster) 40 for adjusting the signal $NS_2$, and a signal synthesizer 42 for synthesizing the signals $SS_3$ and $NS_3$ with each other, which are interconnected as illustrated in the figure. The noise-suppressed signal intensity adjuster 36 and extracted-noise signal intensity adjuster 40 may constitute a signal intensity adjuster 44.

In the present patent application, the term "noise" specifically means a noise contained in an intended speech signal, e.g. a voice sound uttered by a talker, e.g. one of the users $U_2$, and the speech signal consists of a voiced sound component, an unvoiced sound component and a noise component.

The component separator 32 is connected to the output 26 of the receiver 24 and operable to separate the input speech signal $S_{in}$ into the noise-suppressed signal SS and the extracted-noise signal NS. The component separator 32 is also connected to inputs 46 and 48 of the noise-suppressed signal component extender 34 and the extracted-noise signal component extender 38, respectively, and outputs the signals SS and NS to the SS-component extender 34 and the NS-component extender 38, respectively.

Figure 3:
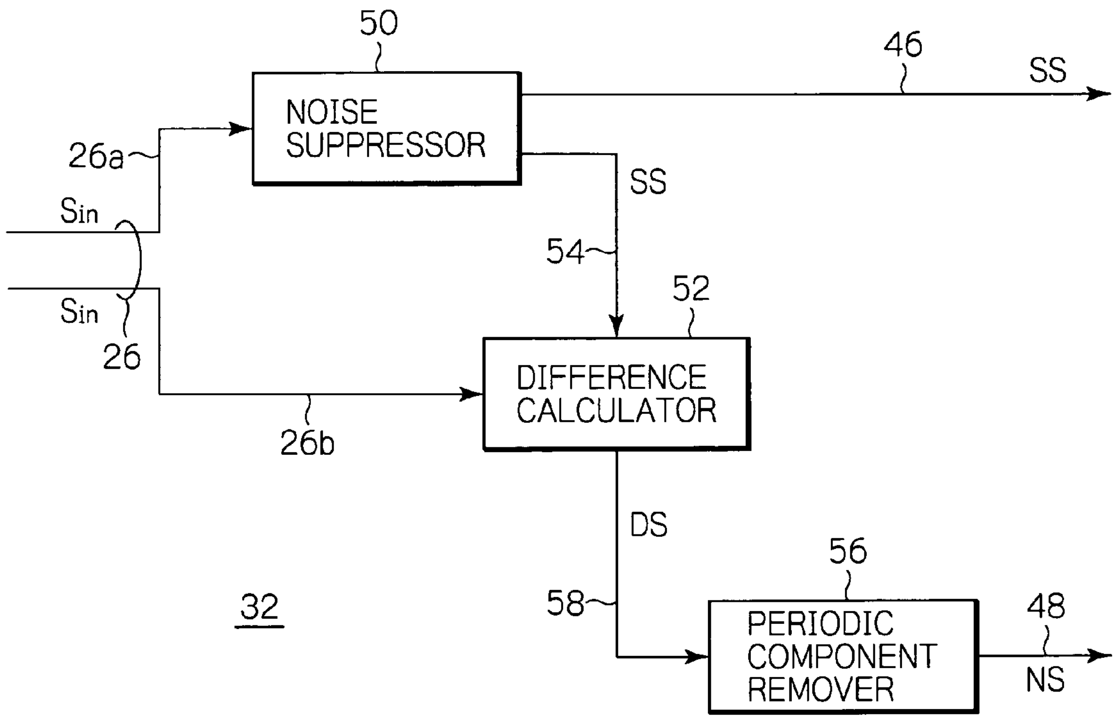
FIG. 3 is a schematic block diagram depicting the component separator shown in FIG. 2.

More in detail, as shown in FIG. 3, the component separator 32 includes a noise suppressor 50, which has its one output 54 connected to a difference calculator 52, which has its other input 26*b* connected to receive the input speech signal $S_{in}$ from the receiver 24, FIG. 1. The difference calculator 52 has its output 58 connected to a periodic component remover 56.

The noise suppressor 50 has its input 26*a* connected to receive the input speech signal $S_{in}$ from the receiver 24 and its other output 46 connected to the input of the noise-suppressed signal component extender 34, FIG. 2. The noise suppressor 50 is adapted to receive the input speech signal $S_{in}$ to remove a noise component from the signal $S_{in}$. The noise suppressor 50 outputs a resulting noise-suppressed signal SS to the noise-suppressed signal component extender 34 and the difference calculator 52.

The noise suppressor 50 may be designed to remove or suppress a noise component in any appropriate manner. In the illustrative embodiment, the noise suppressor 50 removes a noise component by means of spectral subtraction, as will be described below.

Specifically, the noise suppressor 50 determines an average characteristic value, or power spectrum, of noise contained in the input speech signal $S_{in}$ at a predetermined time interval. At each time interval, if a ratio of the input speech signal $S_{in}$ to the average characteristic value of noise, i.e. signal-to-noise (SN) ratio, is smaller than a predetermined value, e.g. 10 dB, the noise suppressor 50 updates a reference characteristic value of noise with the average characteristic value of noise thus determined. The noise suppressor 50 calculates at every time interval a difference of the input speech signal $S_{in}$ from the reference characteristic value of noise to thereby remove the noise component.

As a result of the noise component removal by the spectral subtraction, the SN ratio of the unvoiced sound component in the input speech signal $S_{in}$ does not become too small even when the intensity of the signal is low. Thus, the unvoiced sound component is not removed from the input speech signal $S_{in}$ by the noise suppressor 50. Thus after the noise suppression, the noise-suppressed signal SS consists of the voiced and unvoiced sound components.

In the illustrative embodiment, the noise suppressor 50 is thus adapted to function on the basis of spectral subtraction to remove the noise component, but the invention is not restrictive thereto. For example, the removal of noise component may be carried out by means of an appropriate digital filter adapted for noise suppression, not specifically shown.

The difference calculator 52 is configured to receive the input speech signal $S_{in}$, and the noise-suppressed signal SS and subtract the noise-suppressed signal SS from the input speech signal $S_{in}$ to thereby extract a signal consisting of the noise component contained in the input speech signal $S_{in}$, i.e. difference signal DS. Prior to the subtraction of the signal SS from the signal $S_{in}$, the difference calculator 52 synchronizes the noise-suppressed signal SS with the input speech signal $S_{in}$. The difference signal DS is transferred to the periodic component remover 56. Thus, the difference signal DS thus obtained predominantly consists of the noise component substantially free from the voiced and unvoiced sound components.

The periodic component remover 56 is connected to the output 58 of the difference calculator 52 and the input 48 of the extracted-noise signal component extender 38. The periodic component remover 56 is operable to remove the periodic component contained in the received difference signal DS to thereby extract the extracted-noise signal NS consisting only of the noise component. The periodic component remover 56 then outputs the signal NS to the extracted-noise signal component extender 38. The extracted-noise signal NS thus obtained consists almost exclusively of the noise component.

In summary, the component separator 32 delivers on one hand the noise-suppressed signal SS consisting of the voiced and unvoiced sound components to the noise-suppressed signal component extender 34 and on the other hand the extracted-noise signal NS consisting almost exclusively of the noise component to the extracted-noise signal component extender 38.

Next, the remaining constituent elements of the voice band extender 10 will be described with reference to FIG. 2 again. The noise-suppressed signal component extender 34, which is connected to the output 46 of the component separator 32, has its output 60 interconnected to the noise-suppressed signal intensity adjuster 36. The SS-component extender 34 is operable to perform a frequency extension on the delivered noise-suppressed signal SS and output a resultant noise-suppressed signal $SS_2$, thus extended, to the noise-suppressed signal intensity adjuster 36.

Figure 4:
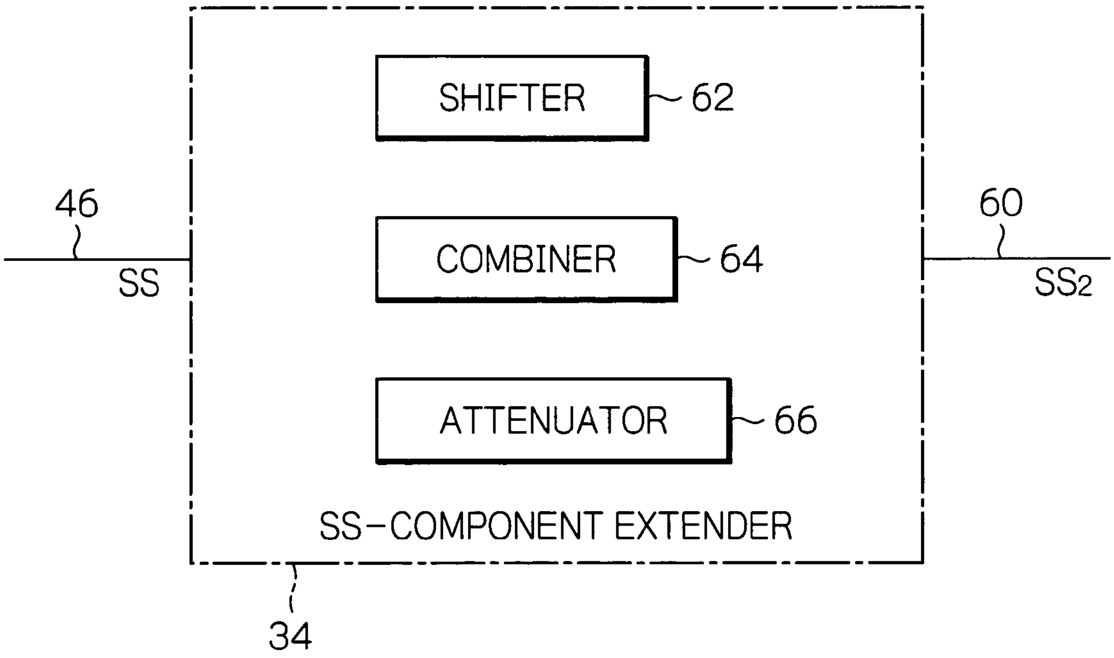
FIG. 4 is a schematic block diagram depicting the noise-suppressed signal component extender shown in FIG. 2.

In the meanwhile, with reference to FIG. 4, the noise-suppressed signal component extender 34 may include a band shifter 62 for shifting the frequency band of the noise-suppressed signal SS to a higher range, a signal combiner 64 for combining the shifted noise-suppressed signal SS with the original signal SS, and an attenuator 66 for attenuating the intensity of the combined signal. The rate of the attenuation is set larger as the frequency increases. Thus, the noise-suppressed signal component extender 34 may be structured in the form of single device functioning as the shifter 62, the combiner 64 and the attenuator 66.

The noise-suppressed signal component extender 34 may carry out an appropriate type of frequency extension on the noise-suppressed signal SS. For example, an available type of frequency extension can be the solution taught in Japanese patent laid-open publication No. 2003-256000 to Tokuda et al., stated earlier. In the illustrative embodiment, an example of frequency extension will be described by referring FIG. 5, part (A), which shows the frequency spectrum of a sound "ah" uttered by a talker, i.e. the user $U_2$ in this example.

The noise-suppressed signal component extender 34 first increases a sampling frequency of the noise-suppressed signal SS from 8 kHz to 16 kHz. Then, the SS-component extender 34, in particular the shifter 62, shifts the frequency band of a noise-suppressed signal $SS_0$ ranging between 0.3 and 3.4 kHz to the higher frequency side by 3.1 kHz, see FIG. 5, part (B), to produce a noise-suppressed signal SS whose frequency band is shifted to a range of 3.4 to 6.5 kHz. The extender 34 then filters the shifted noise-suppressed signal by using a high-frequency band-pass filter, not shown, to thereby extract a high-frequency component, i.e. noise-suppressed signal $SS_1$, see FIG. 5, part (C).

The extender 34, preferably the signal combiner 64, subsequently combines the noise-suppressed signals $SS_0$ and $SS_1$ to develop a noise-suppressed signal having its frequency band ranging from 0.3 to 6.5 kHz.

Figure 5:
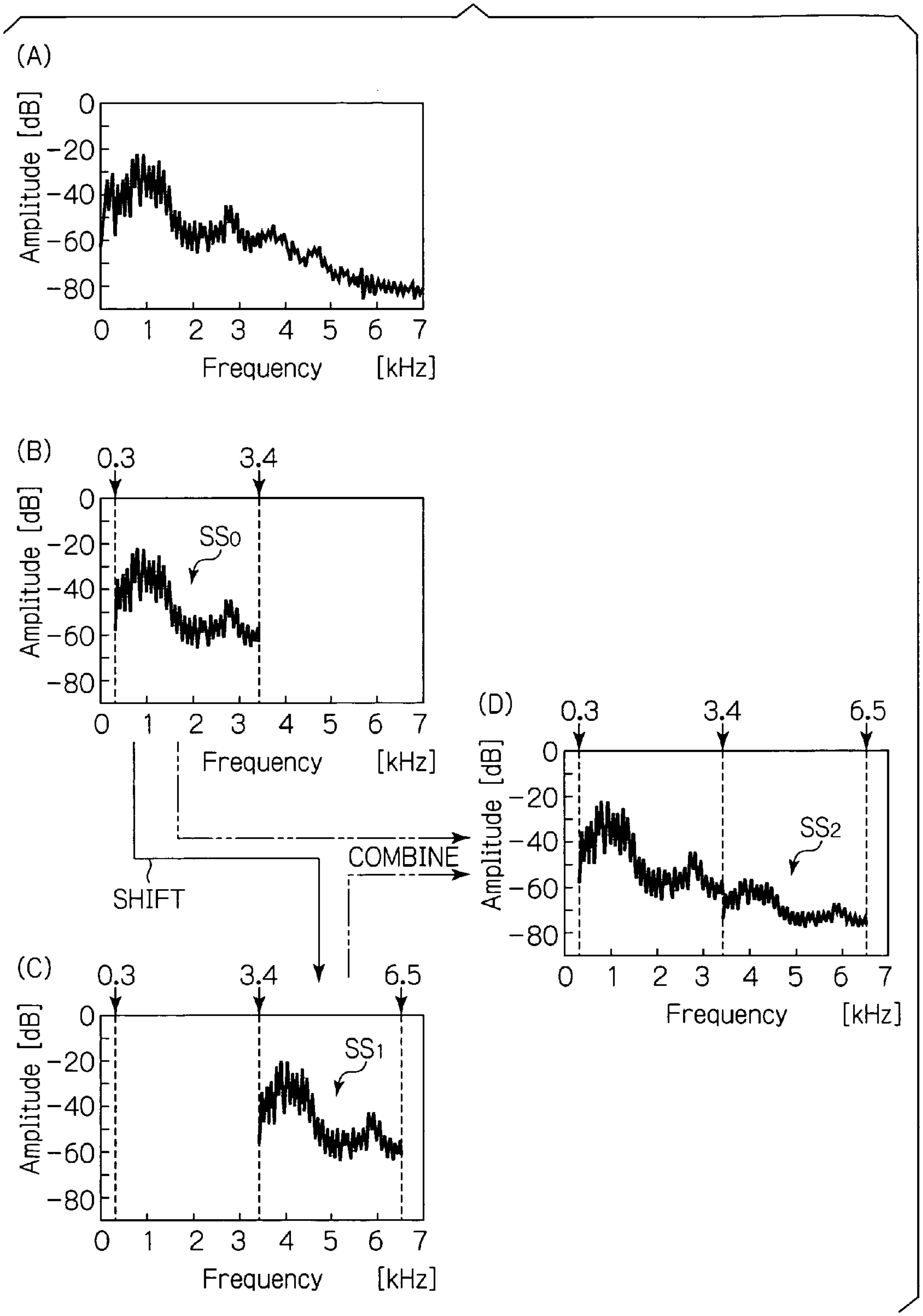
FIG. 5 plots frequency spectra, parts (A) to (D) respectively representing an example of voice sound produced by a user $U_2$, a noise-suppressed signal $SS_0$, a noise-suppressed signal $SS_1$ in which a frequency band is shifted to extract a high-frequency component, and a noise-suppressed signal $SS_2$ obtained through a band-pass filter.

Then, the extender 34 filters the combined noise-suppressed signal by means of the attenuator 66 such as a band-pass filter having a gentle attenuation characteristic reflecting the formant shapes of voiced sound/unvoiced sound to produce an attenuated noise-suppressed signal $SS_2$, see FIG. 5, part (D). As a result, the signal intensity, or amplitude, on the high-frequency band is particularly attenuated, and thereby the reproducibility of voice sound is improved to the listener. The reproducibility of voice sound can be much more improved by applying a band-pass filter having its frequency band shifted to the higher frequency side, e.g. frequency of 3.4 to 6.5 kHz.

In this way, the noise-suppressed signal component extender 34 can produce, from the noise-suppressed signal $SS_0$ having the frequency band of 0.3 to 3.4 kHz, the extended noise-suppressed signal $SS_2$ whose frequency band is extended to the range of 0.3 to 6.5 kHz.

Returning to FIG. 2, the noise-suppressed signal intensity adjuster 36, connected to the output 60 of the noise-suppressed signal component extender 34, has its output interconnected to the signal synthesizer 42. The SS-intensity adjuster 36 is adapted to adjust the intensity of the extended noise-suppressed signal $SS_2$ received from the SS-component extender 34, producing an adjusted noise-suppressed signal $SS_3$ to the synthesizer 42.

More specifically, the noise-suppressed signal intensity adjuster 36 in the illustrative embodiment is adapted to obtain the maximum signal intensity of the extended noise-suppressed signal $SS_2$ to adjust the signal intensity of the entire extended noise-suppressed signal $SS_2$ so as to make the maximum signal intensity substantially equal to a predetermined signal intensity value $SP_{36}$, thereby producing the adjusted noise-suppressed signal $SS_3$. The SS-intensity adjuster 36 then supplies the signal synthesizer 42 with the signal $SS_3$ at a sampling frequency of 16 kHz in a frequency band of 0.3 to 6.5 kHz.

The predetermined signal intensity value $SP_{36}$ may be set to be substantially equal to the intensity or strength of the voice sound signal output from the voice converter 18 at which the listener, or user, $U_1$ may easily listen to the sound uttered by the talker, or user, $U_2$. The predetermined signal intensity value $SP_{36}$ may be stored in any devices, for example, the SS-intensity adjuster 36 or the memory 30, FIG. 1.

Although the voice band extender 10 of the illustrative embodiment has the SS-component extender 34 and the SS-intensity adjuster 36 separately provided from each other, the SS-component extender 34 may take the place of the SS-intensity adjuster 36 to implement the intensity adjustment after the frequency extension.

Incidentally, when the noise component is removed from a sampled sound signal by the noise suppressor 50 using the spectral subtraction, a phenomenon called "missing" often occurs in which the signal intensity of a noise exceeds the signal intensity of a sampled sound signal. To solve this problem, when the spectral subtraction is used to remove or suppress noise by the noise suppressor 50, the noise-suppressed signal intensity adjuster 36 and the extracted-noise signal intensity adjuster 40 may be adapted, with the missing taken into account, to adjust the signal intensity of the extended extracted-noise signal $NS_2$ so as to be lower than that of the extended noise-suppressed signal $SS_2$.

Now, the component separator 32 has its output 48 connected to the extracted-noise signal component extender 38, which is in turn connected to an input 70 of the extracted-noise signal intensity adjuster 40. The NS-component extender 38 is configured to perform frequency extension on the received extracted-noise signal NS and output a resultant extracted-noise signal $NS_2$, namely extended extracted-noise signal $NS_2$, to the extracted-noise signal intensity adjuster 40. In this embodiment, the NS-component extender 38 may operate in a way similar to the SS-component extender 34, and therefore a redundant description thereon will be omitted.

Figure 6:
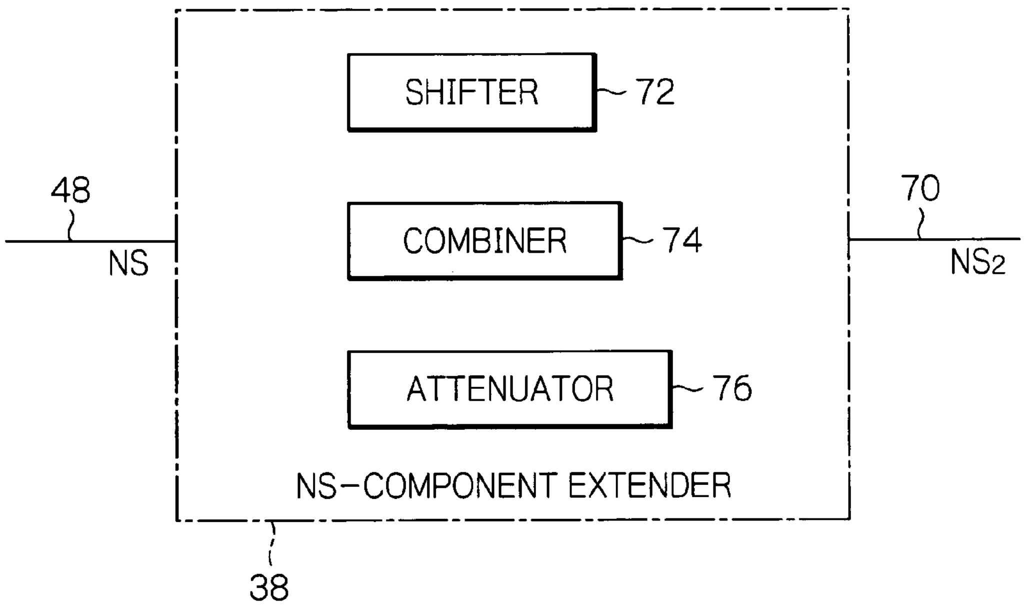
FIG. 6 is a schematic block diagram depicting the extracted-noise signal component extender shown in FIG. 2.

In the meanwhile, as shown in FIG. 6, the extracted-noise signal component extender 38 may include a frequency shifter 72 for shifting the frequency band of the extracted-noise signal NS to a higher range, a signal combiner 74 for combining the shifted signal NS with the original signal SS, and an attenuator 76 for attenuating the intensity of the combined signal. The attenuation rate is set larger in a higher frequency range. Thus, the extracted-noise signal component extender 38 may be structured in the form of single device functioning as the shifter 72, the combiner 74 and the attenuator 76.

The extracted-noise signal intensity adjuster 40 is connected to receive the output 70 of the NS-component extender 38 and has its output 78 interconnected to the signal synthesizer 42. The NS-intensity adjuster 40 is adapted to adjust the intensity of the extended extracted-noise signal $NS_2$ received, producing a resulting extracted-noise signal $NS_3$ thus adjusted to the synthesizer 42. The operation of the NS-intensity adjuster 40 may be partially similar to that of the SS-intensity adjuster 36, and will therefore be described with a redundant description thereon refrained from for simplicity.

The extracted-noise signal intensity adjuster 40 derives the maximum signal intensity of the extended extracted-noise signal $NS_2$ to adjust the signal intensity of the overall signal $NS_2$ so as to make the maximum signal intensity substantially equal to a predetermined signal intensity value $SP_{40}$, thereby producing the adjusted extracted-noise signal $NS_3$. In this regard, the NS-intensity adjuster 40 adjusts the signal intensity of the signal $NS_2$ to be lower than the signal intensity $SP_{36}$ adjusted by the SS-intensity adjuster 36, that is, establish the relationship of $SP_{36}>SP_{40}$. Then, the NS-intensity adjuster 40 supplies the synthesizer 42 with the adjusted extracted-noise signal $NS_3$ at a sampling frequency of 16 kHz in a frequency band of 0.3 to 6.5 kHz.

The predetermined signal intensity value $SP_{40}$ may be set to be substantially equal to the signal intensity of the noise output from the voice converter 18 at which the listener $U_1$ may naturally listen to the voice sound clearly distinguishable from the noise. The predetermined signal intensity value $SP_{40}$ may be stored in any devices, for example, the NS-intensity adjuster 40 or the memory 30.

Although the voice band extender 10 of the illustrative embodiment has the extracted-noise signal component extender and the extracted-noise signal intensity adjuster 40 separately provided from each other, the NS-component extender 38 may take the place of the NS-intensity adjuster 40 to implement the intensity adjustment after the frequency extension.

The signal synthesizer 42 is operable to receive the adjusted noise-suppressed signal $SS_3$ from the noise-suppressed signal intensity adjuster 36 and the adjusted extracted-noise signal $NS_3$ from the extracted-noise signal intensity adjuster 40 to synchronize, and thereafter combine, the signals $SS_3$ and $NS_3$ with each other, thereby producing a band-extended speech signal $S_{out}$ to the voice converter 18.

Next, the operation of the voice band extender 10 of this embodiment will be described with reference further to FIGS. 7 and 8. Firstly, a voice sound produced by the user $U_2$, i.e. talker, which may exhibit the frequency spectrum as exemplified in FIG. 5, part (A), is caught by the telephone terminal unit 14*b* and transmitted over the telecommunications line 16*b* as speech signal, which is in turn received by the receiver 24 and ultimately input to the voice band extender 10. Then, the component separator 32 included in the voice band extender 10 obtains the input speech signal $S_{in}$ (step S102, FIG. 7).

The component separator 32 separates the signal $S_{in}$, into the noise-suppressed signal SS and the extracted-noise signal NS (step S104). Then, the component separator 32 supplies the signal SS to the noise-suppressed signal component extender (step S106) while supplying the signal NS to the extracted-noise signal component extender 38 (step S108).

The signal separation processed by the component separator 32 in step S104 will be described in detail by referring to FIG. 8 as well as FIGS. 1-3 and 5. At first, the noise suppressor 50 receives the input speech signal $S_{in}$, on the signal line 26*a*, FIG. 3 (step S120, corresponding to step S102, FIG. 7). The noise suppressor 50 then removes a noise component from the signal $S_{in}$ to produce the noise-suppressed signal SS (step S122), and delivers the signal SS to the difference calculator 52 (step S124) and to the noise-suppressed signal component extender 34 (step S106, also shown in FIG. 7).

Figure 7:
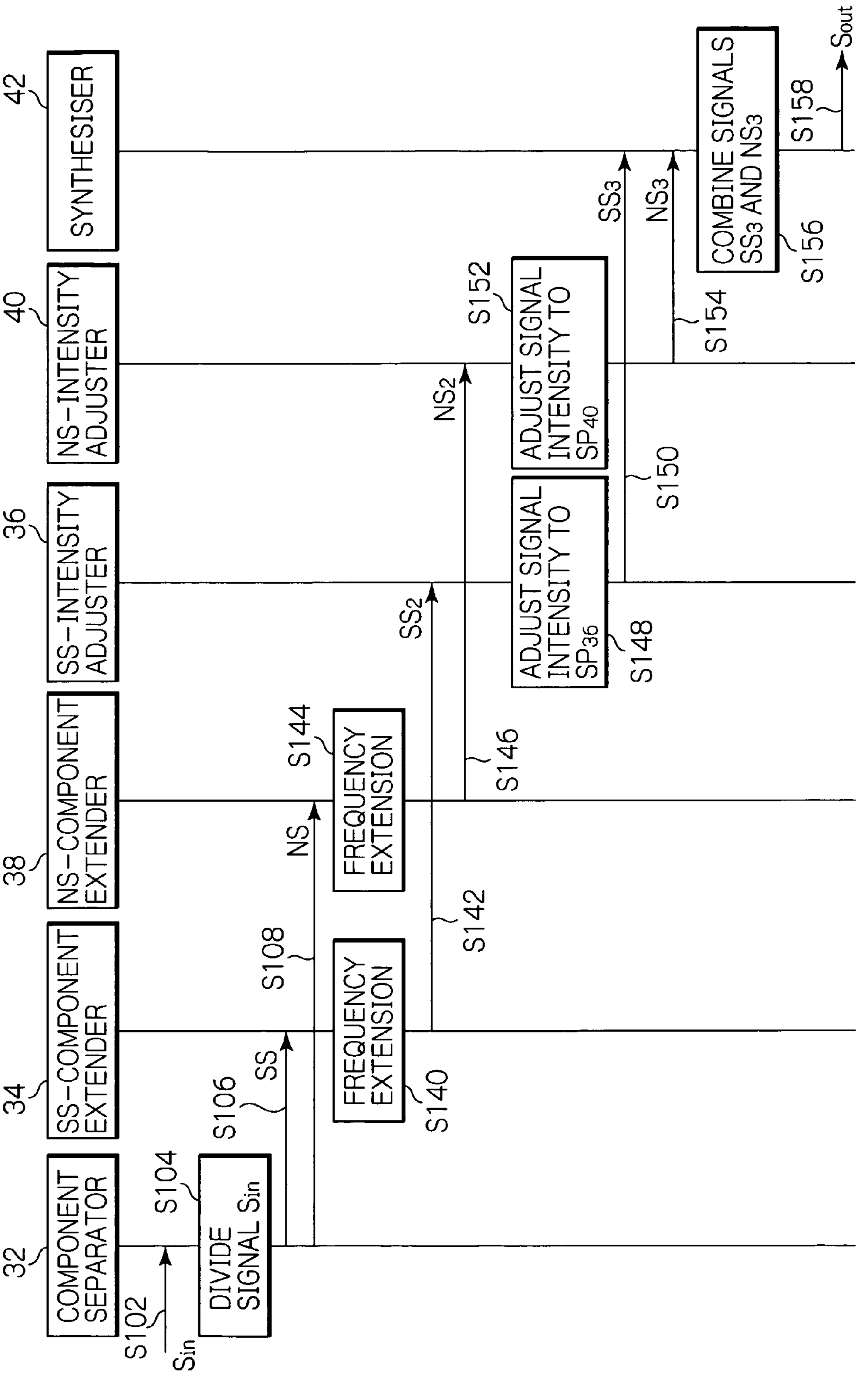
FIG. 7 is a sequence chart useful for understanding an operation of the voice band extender according to the preferred embodiment.
Figure 8:
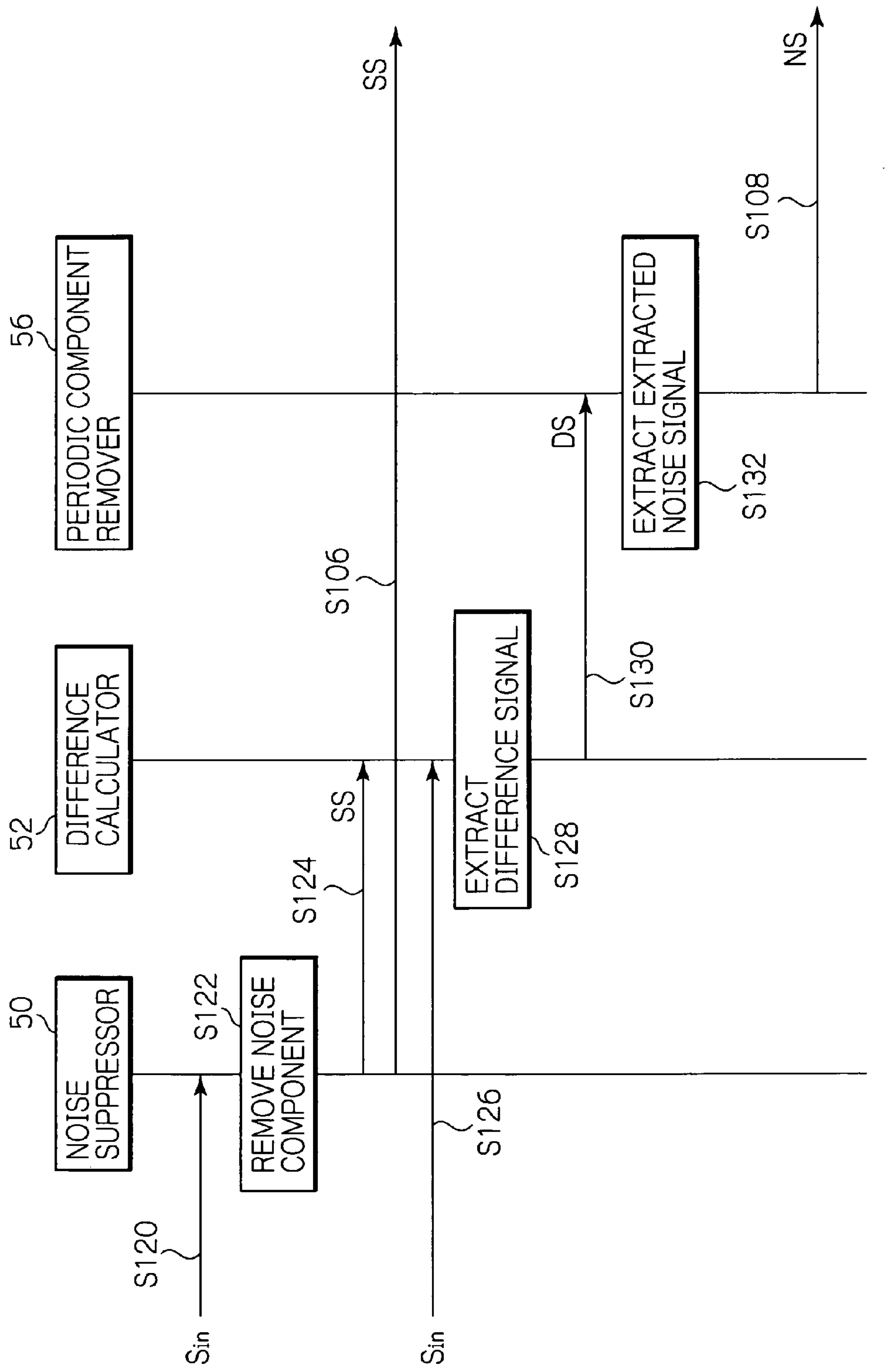
FIG. 8 is a sequence chart useful for understanding an operation of the component separator in the voice band extender according to the preferred embodiment.

In the meanwhile, the difference calculator 52 also receives the input speech signal $S_{in}$ on the signal line 26*b* (step S126, corresponding to step S102, FIG. 7). The difference calculator 52 subsequently subtracts the noise-suppressed signal SS from the input speech signal $S_{in}$ to thereby extract the difference signal DS consisting of the noise component contained in the input speech signal $S_{in}$ (step S128). Then the difference calculator 52 supplies the difference signal DS to the periodic component remover 56 (step S130).

The periodic component remover 56 removes the periodic component contained in the received difference signal DS to thereby extract the extracted-noise signal NS consisting only of the noise component (step S132). The periodic component remover 56 then outputs the extracted-noise signal NS to the extracted-noise signal component extender 38 (step S108 also shown in FIG. 7). In this way, the component separator 32, in particular the noise suppressor 50, outputs the noise-suppressed signal SS to the noise-suppressed signal component extender 34 while the remover 56 outputs the signal NS to the NS-component extender 38.

The noise-suppressed signal component extender 34 in turn performs the frequency extension on the received noise-suppressed signal SS to thereby produce the extended noise-suppressed signal $SS_2$ (step S140). Subsequently, the SS-component extender 34 outputs the produced signal $SS_2$ to the noise-suppressed signal intensity adjuster 36 (step S142).

Similarly, the extracted-noise signal component extender 38 performs the frequency extension on the received extracted-noise signal NS to thereby produce the extended extracted-noise signal $NS_2$ (step S144) and then outputs the produced signal $NS_2$ to the extracted-noise signal intensity adjuster 40 (step S146).

The noise-suppressed signal intensity adjuster 36 carries out the intensity adjustment on the signal $SS_2$ to produce the adjusted noise-suppressed signal $SS_3$ (step S148). The SS-intensity adjuster 36 then outputs the produced signal $SS_3$ to the synthesizer 42 (step S150).

Similarly, the extracted-noise signal intensity adjuster 40 adjusts the intensity of the signal $NS_2$ to produce the adjusted noise-suppressed signal $NS_3$ (step S152) and then outputs the produced signal $NS_3$ to the synthesizer 42 (step S154).

The synthesizer 42, when receiving the adjusted noise-suppressed signal $SS_3$ and the adjusted extracted-noise signal $NS_3$, synchronizes, and then combines, the received signals $SS_3$ and $NS_3$ with each other (step S156) to output a resulting band-extended speech signal $S_{out}$ to the voice converter 18 (step S158). The voice band extender 10 thus terminates its entire operation.

In the illustrative embodiment, the voice band extender 10 may include a single unit of signal intensity adjuster 44, as depicted in FIG. 2 with a chain line, which is performable the functions of the noise-suppressed signal intensity adjuster 36 and the extracted-noise signal intensity adjuster 40. The signal intensity adjuster 44 formed as a single operating section operates as will be described below.

The signal intensity adjuster 44 firstly receives the extended noise-suppressed signal $SS_2$ from the noise-suppressed signal component extender 34 as well as the extended extracted-noise signal $NS_2$ from the extracted-noise signal component extender 38. The signal intensity adjuster 44 in turn compares the maximum signal intensity of the extended noise-suppressed signal $SS_2$ with that of the extended extracted-noise signal $NS_2$ to adjust the signal intensity of either or both of the signals $SS_2$ and $NS_2$ so as to make the maximum signal intensity of the signal $NS_2$ lower than that of the signal $SS_2$. Then, the signal intensity adjuster 44 supplies the synthesizer 42 with the adjusted noise-suppressed signal $SS_3$ and the adjusted extracted-noise signal $NS_3$ obtained by the adjustment performed by the unit 44.

In summary, the voice band extender 10 according to the illustrative embodiment separates the input speech signal $S_{in}$ into the noise-suppressed signal SS, which is a non-noise or noise-free signal, and the extracted-noise signal NS, which is a noise component signal. The extender 10 extends the frequency band of the signals SS and NS and then adjusts the signal intensity of the extended extracted-noise signal $NS_2$, in which the frequency of the extracted-noise signal NS is extended, to be lower than the signal intensity of the extended noise-suppressed signal $SS_2$, in which the frequency of the noise-suppressed signal SS is extended, thus the intensity adjustment being performed. Thus, the voice band extender 10 can adjust the intensity of a voice sound signal output from the voice converter 18, namely, the signal intensity of the extended noise-suppressed signal $SS_2$, to a sufficient level for a listener, user $U_1$ in this example, to easily listen with the intensity of the noise component output from the voice converter 18, that is, the signal intensity of the extended extracted-noise signal $NS_2$, rendered to a natural level enough for the listener $U_1$ to easily make out the noise from the voice sound. Thus, an unpleasant noise can be removed from or suppressed in the voice sound signal output from the voice converter 18, thus improving the quality of voice sound in, e.g. sound clearness.

In addition, the voice band extender 10 according to the illustrative embodiment adds a signal having a higher frequency band, i.e. 3.4 to 6.5 kHz, than that of the input speech signal $S_{in}$, i.e. 0.3 to 3.4 kHz, so that it is possible to reproduce and provide the content of utterance with a voice sound whose frequency band is extended to the range easily audible to listeners, even such as elderly people or small children. The voice band extender 10 uses the band-pass filter having a gentle attenuation characteristic reflecting the formant shapes of voiced sound/unvoiced sound to output the reproduced voice sound of a talker, such as the user $U_1$, through the voice converter 18, thereby increasing the clearness of voice sound.

Figure 9:
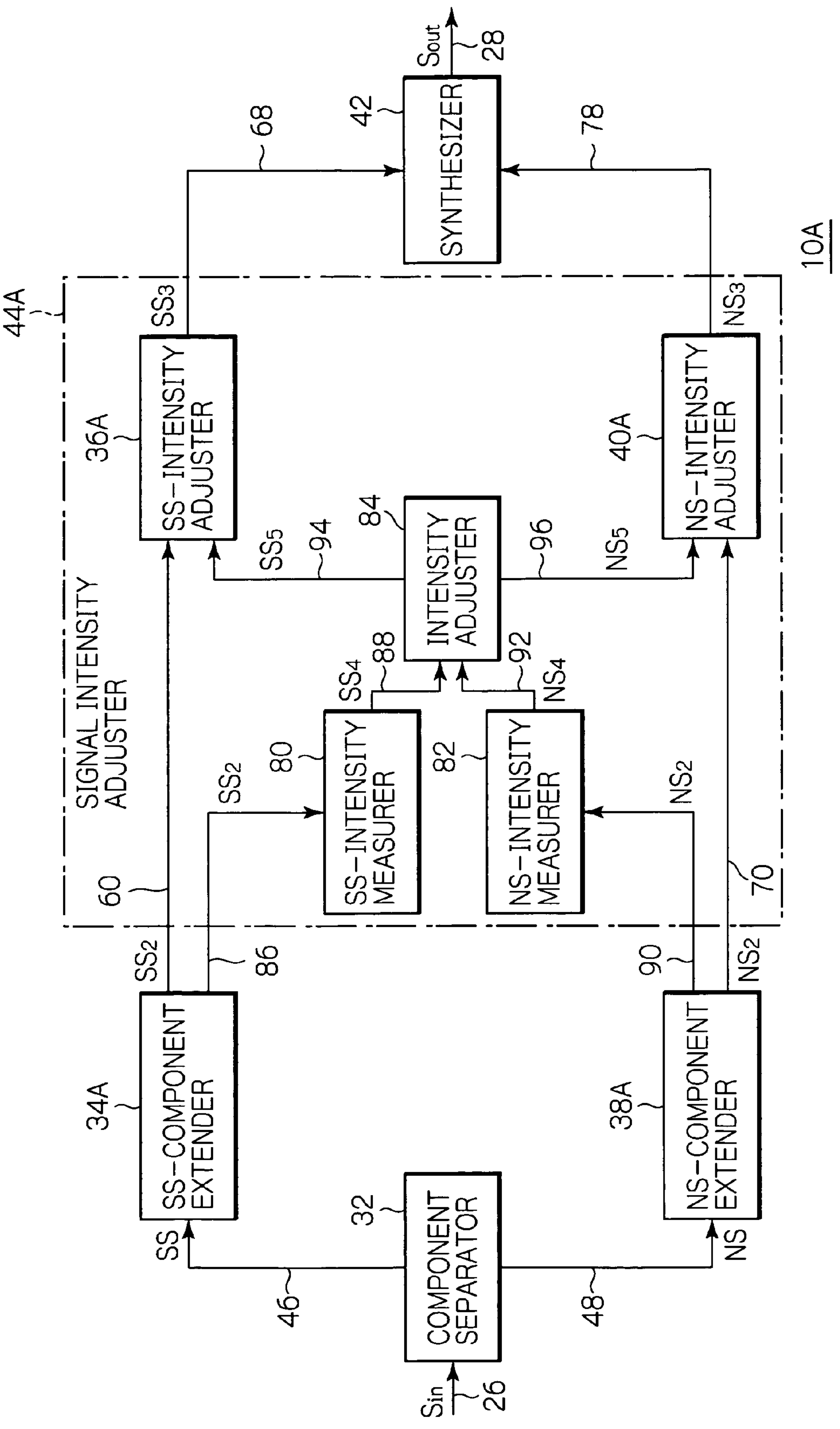
FIG. 9 is a schematic block diagram showing the internal configuration of a voice band extender according to an alternative embodiment.

Next, an alternative embodiment of the voice band extender will be described in detail with reference to the drawings. FIG. 9 is a schematic block diagram showing the internal structure of a voice band extender 10A according to the alternative embodiment. The voice band extender 10A comprises a signal intensity adjuster 44A, which may be similar to the signal intensity adjuster 44 of the voice band extender 10 of the previous embodiment shown in FIG. 2. The voice band extender 10A further includes a noise-suppressed signal component extender 34A and an extracted-noise signal component extender 38A, both of which may operate partly differently from the noise-suppressed signal component extender 34 and the extracted-noise signal component extender 38, respectively, of the previous embodiment.

The signal intensity adjuster 44A includes a noise-suppressed signal intensity measurer 80 for measuring the signal intensity of the signal $SS_2$, an extracted-noise signal intensity measurer 82 for measuring the signal intensity of the signal $NS_2$, and an intensity adjuster 84 for adjusting the signal intensity of input signals. The intensity adjuster 44A further includes a noise-suppressed signal intensity adjuster 36A and an extracted-noise signal intensity adjuster 40A, both of which may operation partly differently from the adjusters 36 and 40, respectively, of the previous embodiment.

In the voice band extender 10A, the component separator 32 is adapted for separating the signal $S_{in}$ and has its outputs 46 and 48 connected to the signal component extenders 34A and 38A, respectively. The noise-suppressed signal component extender 34A supplies an extended noise-suppressed signal $SS_2$ obtained therein by the frequency extension to the noise-suppressed signal intensity measurer 80 and the noise-suppressed signal intensity adjuster 36A. In a similar manner, the extracted-noise signal component extender 38A supplies an extended extracted-noise signal $NS_2$ obtained therein by the frequency extension to the extracted-noise signal intensity measurer 82 and the extracted-noise signal intensity adjuster 40A.

The noise-suppressed signal intensity measurer 80, connected to an output 86 of the noise-suppressed signal component extender 34A, has its output 88 interconnected to the intensity adjuster 84 and is adapted to measure the signal intensity of the extended noise-suppressed signal $SS_2$, when received from the SS-component extender 34A, to thereby produce noise-suppressed signal intensity information $SS_4$ to the intensity adjuster 84.

Likewise, the extracted-noise signal intensity measurer 82, connected to an output 90 of the extracted-noise signal component extender 38A, has its output 92 interconnected to the intensity adjuster 84 and is adapted to measure the signal intensity of the extended extracted-noise signal $NS_2$, when received from the NS-component extender 38A, to thereby produce extracted-noise signal intensity information $NS_4$ to the intensity adjuster 84.

The intensity adjuster 84 is connected to outputs 88 and 92 of the intensity measurers 80 and 82, respectively, and has its outputs 94 and 96 interconnected to the intensity adjusters 36A and 40A, respectively. The intensity adjuster 84 is responsive to the noise-suppressed signal intensity information $SS_4$ and the extracted-noise signal intensity information $NS_4$ to determine the values of intensity adjustment of the extended noise-suppressed signal $SS_2$ and the extended extracted-noise signal $NS_2$ to produce noise-suppressed signal intensity adjustment information $SS_5$ and extracted-noise signal intensity adjustment information $NS_5$, which will be used by the noise-suppressed signal intensity adjuster 36A and the NS-intensity adjuster 40A, as described later. The intensity adjuster 84 then delivers the noise-suppressed signal intensity adjustment information $SS_5$ to the SS-intensity adjuster 36A and the extracted-noise signal intensity adjustment information $NS_5$ to the NS-intensity adjuster 40A.

In the alternative embodiment, the intensity adjuster 84 adjusts the values carried on the noise-suppressed signal intensity adjustment information $SS_5$ and extracted-noise signal intensity adjustment information $NS_5$ such that the signal intensity of the extracted-noise signal intensity information $NS_4$ becomes lower than that of the noise-suppressed signal intensity information $SS_4$. In addition, the intensity adjuster 84 adjusts the signal intensity of the noise-suppressed signal intensity adjustment information $SS_5$ and the extracted-noise signal intensity adjustment information $NS_5$ so as to satisfy the inequality of $Qn/Qs \leqq 0.178$, where Qs is the signal intensity of the adjusted noise-suppressed signal $SS_3$ output by the noise-suppressed signal intensity adjuster 36A, and Qn is the signal intensity of the adjusted extracted-noise signal $NS_3$ output by the extracted-noise signal intensity adjuster 40A, as will be described later.

When the adjustment of signal intensity is performed, the intensity adjuster 84 uses the noise-suppressed signal intensity information $SS_4$ and the extracted-noise signal intensity information $NS_4$ to determine whether or not a determination condition is satisfied, that is, the ratio $NS_4/SS_4$ is equal to or smaller than 0.178. If the determination condition is satisfied, the intensity adjuster 84 then sets the extracted-noise signal intensity adjustment information $NS_5$ to a value of "1.0" and supplies it to the extracted-noise signal intensity adjuster 40A to thereby prevent the NS-intensity adjuster 40A from executing the signal intensity adjustment. If the determination condition is not satisfied, the intensity adjuster 84 then sets the extracted-noise signal intensity adjustment information $NS_5$ to a value of "0.178" and supplies it to the NS-intensity adjuster 40A.

The extracted-noise signal intensity adjustment information $NS_5$ output in the case where the determination condition is satisfied may be any type of information that can prevent the extracted-noise signal intensity adjuster 40A from performing the signal intensity adjustment. By way of example, such information may be in the form of flag indicative of inhibition of signal intensity adjustment.

The determination condition may be defined arbitrarily at the designing stage of the system on the premise of the avoidance of the relationship of Qn>Qs so that the quality of the band-extended speech signal $S_{out}$ output from the synthesizer 42 will be the best.

The noise-suppressed signal intensity adjustment information $SS_5$ may be a gain value for use in adjusting the intensity of the signal, namely extended noise-suppressed signal $SS_2$, fed to the noise-suppressed signal intensity adjuster 36A. Likewise, the extracted-noise signal intensity adjustment information $NS_5$ may be a gain value for use in adjusting the intensity of the signal, or extended extracted-noise signal $NS_2$, fed to the extracted-noise signal intensity adjuster 40A.

When the noise-suppressed signal intensity adjuster 36A and the extracted-noise signal intensity adjuster 40A adjust the signal intensity in plural frequency bands, e.g. there are several talkers on the premises of the user $U_2$ so that the input speech signal $S_{in}$ carries voice sounds produced by the several talkers, the intensity adjuster 84 produces the noise-suppressed signal intensity adjustment information $SS_5$ and the extracted-noise signal intensity adjustment information $NS_5$ as a group of gains including predetermined coefficients for distinguishing the frequency bands from one another.

The noise-suppressed signal intensity adjuster 36A is connected to the outputs 60 and 94 of the noise-suppressed signal component extender 34A and the intensity adjuster 84, respectively, and has its output 68 interconnected to the synthesizer 42. The noise-suppressed signal intensity adjuster 36A is configured to receive the extended noise-suppressed signal $SS_2$ and the noise-suppressed signal intensity adjustment information $SS_5$ to adjust the signal intensity of the extended noise-extracted signal $SS_2$ with the value of intensity adjustment included in the noise-suppressed signal intensity adjustment information $SS_5$ to then output an adjusted noise-suppressed signal $SS_3$ obtained by the intensity adjustment to the synthesizer 42.

In a similar manner, the extracted-noise signal intensity adjuster 40A is connected to the outputs 70 and 96 of the extracted-noise signal component extender 38A and the intensity adjuster 84, respectively, and has its output 78 interconnected to the synthesizer 42. The extracted-noise signal intensity adjuster 40A is adapted to receive the extended extracted-noise signal $NS_2$ and the extracted-noise signal intensity adjustment information $NS_5$ to adjust the signal intensity of the signal $NS_2$ with the value of intensity adjustment included in the information $NS_5$ to output an adjusted extracted-noise signal $NS_3$ obtained by the adjustment to the synthesizer 42.

Figure 10:
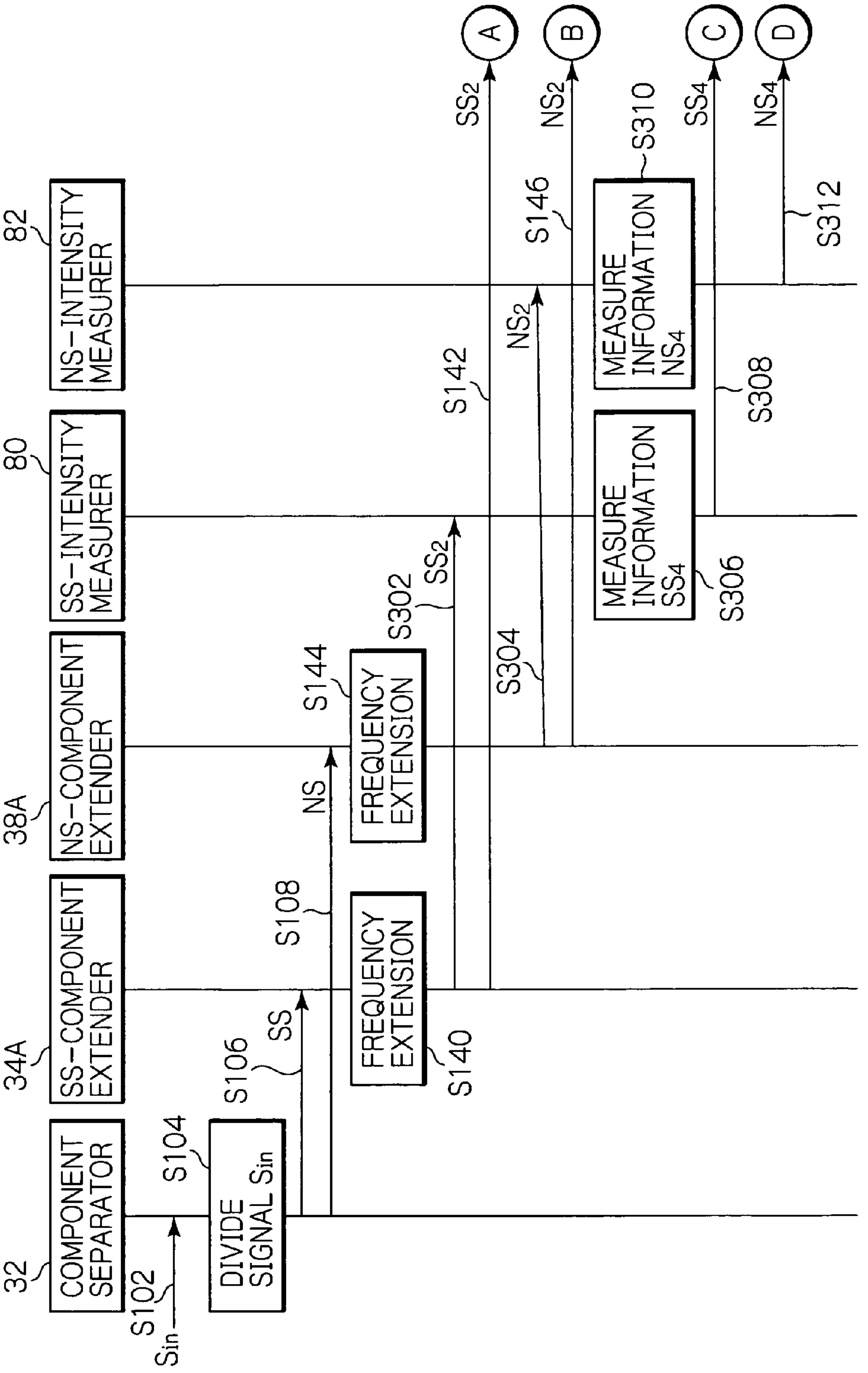
FIGS. 10 and 11 are a suite of sequence charts useful for understanding an operation of the voice band extender shown in FIG. 9.

Now, the operation of the voice band extender 10A of the alternative embodiment will be described with reference to FIGS. 10 to 11 and appropriately referring to FIG. 9. In the alternative embodiment, FIG. 10 repetitively shows the steps S102 to S146 shown in FIG. 7, on which a redundant description will be avoided for simplicity.

In step S302, the noise-suppressed signal component extender 34A supplies the signal $SS_2$ to the noise-suppressed signal intensity measurer 80 as well as the noise-suppressed signal intensity adjuster 36A.

Similarly, the extracted-noise signal component extender 38A then supplies the signal $NS_2$ to the extracted-noise signal intensity measurer 82 (step S304) as well as the extracted-noise signal intensity adjuster 40A.

The noise-suppressed signal intensity measurer 80 in turn measures the signal intensity of the extended noise-suppressed signal $SS_2$, namely, the noise-suppressed signal intensity information $SS_4$ (step S306), and feeds the information $SS_4$ to the intensity adjuster 84 (step S308).

The extracted-noise signal intensity measurer 82 also measures the signal intensity of the extended noise-suppressed signal $NS_2$, i.e. the noise-suppressed signal intensity information $NS_4$ (step S310), and feeds the information $NS_4$ to the intensity adjuster 84 (step S312).

Figure 11:
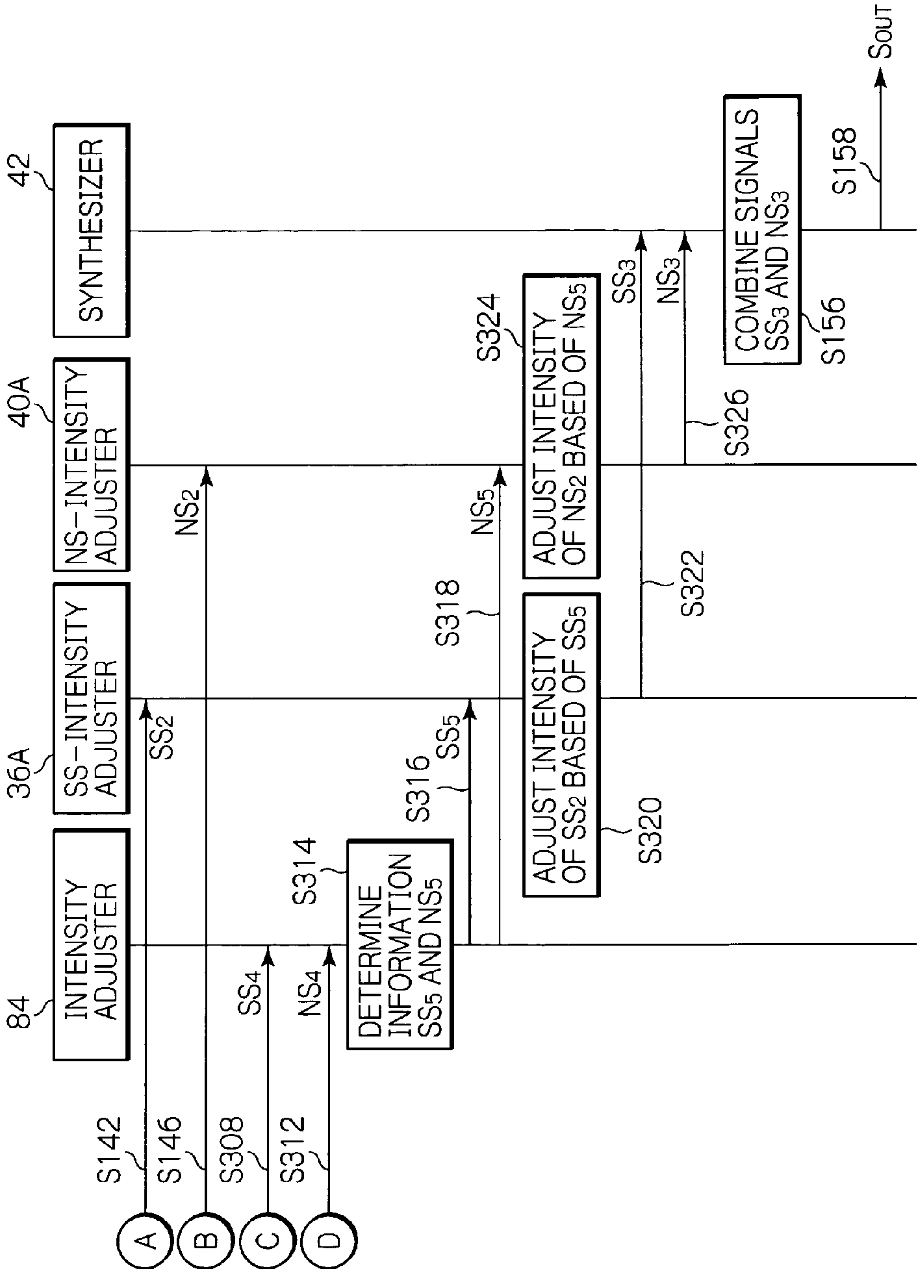

The intensity adjuster 84 receives the noise-suppressed signal intensity information $SS_4$ (step S308) and the extracted-noise signal intensity information $NS_4$ (step S312) to determine the values of intensity adjustment of the extended noise-suppressed signal $SS_2$ and the extended extracted-noise signal $NS_2$, i.e. the noise-suppressed signal intensity adjustment information $SS_5$ and the extracted-noise signal intensity adjustment information $NS_5$ (step S314, FIG. 11). The intensity adjuster 84 subsequently delivers the information $SS_5$ to the noise-suppressed signal intensity adjuster 36A (step S316) while delivering the information $NS_5$ to the extracted-noise signal intensity adjuster 40A (step S318).

Thus, the noise-suppressed signal intensity adjuster 36A acquires the extended noise-suppressed signal $SS_2$ (step S142) and the noise-suppressed signal intensity adjustment information $SS_5$ (step S316). The SS-intensity adjuster 36A in turn adjusts the signal intensity of the signal $SS_2$ on the basis of the value of intensity adjustment included in the information $SS_5$ (step S320) to output the adjusted noise-suppressed signal $SS_3$ obtained by the adjustment to the synthesizer 42 (step S322).

Similarly, the extracted-noise signal intensity adjuster 40A carries out the similar process to that of the SS-intensity adjuster 36A, that is, acquires the extended extracted-noise signal $NS_2$ and the extracted-noise signal intensity adjustment information $NS_5$ (steps S146 and S318) to adjust the signal intensity of the signal $NS_2$ on the basis of the value of intensity adjustment included in the information $NS_5$ (step S324). After that, the NS-intensity adjuster 40A supplies the synthesizer 42 with the adjusted extracted-noise signal $NS_3$ after the adjustment of the signal intensity (step S326).

In the alternative embodiment, the procedure performed by the synthesizer 42 may be similar to that in the steps S156 and S158 illustrated in FIG. 7. Thus, a repetitive description on the operation of the synthesizer 42 will be avoided. Thus, the voice band extender 10 terminates its operation.

In short, the voice band extender 10A according to the alternative embodiment can adjust the signal intensity to a suitable level where the signal intensity of the extended extracted-noise signal $NS_2$ does not become greater than that of the extended noise-suppressed signal $SS_2$ even without setting predetermined signal intensity such as $SP_{36}$ and $SP_{40}$. In addition, as the alternative embodiment also attains the same advantages as the previous embodiment, the quality of voice sound can be improved much better.

Figure 12:
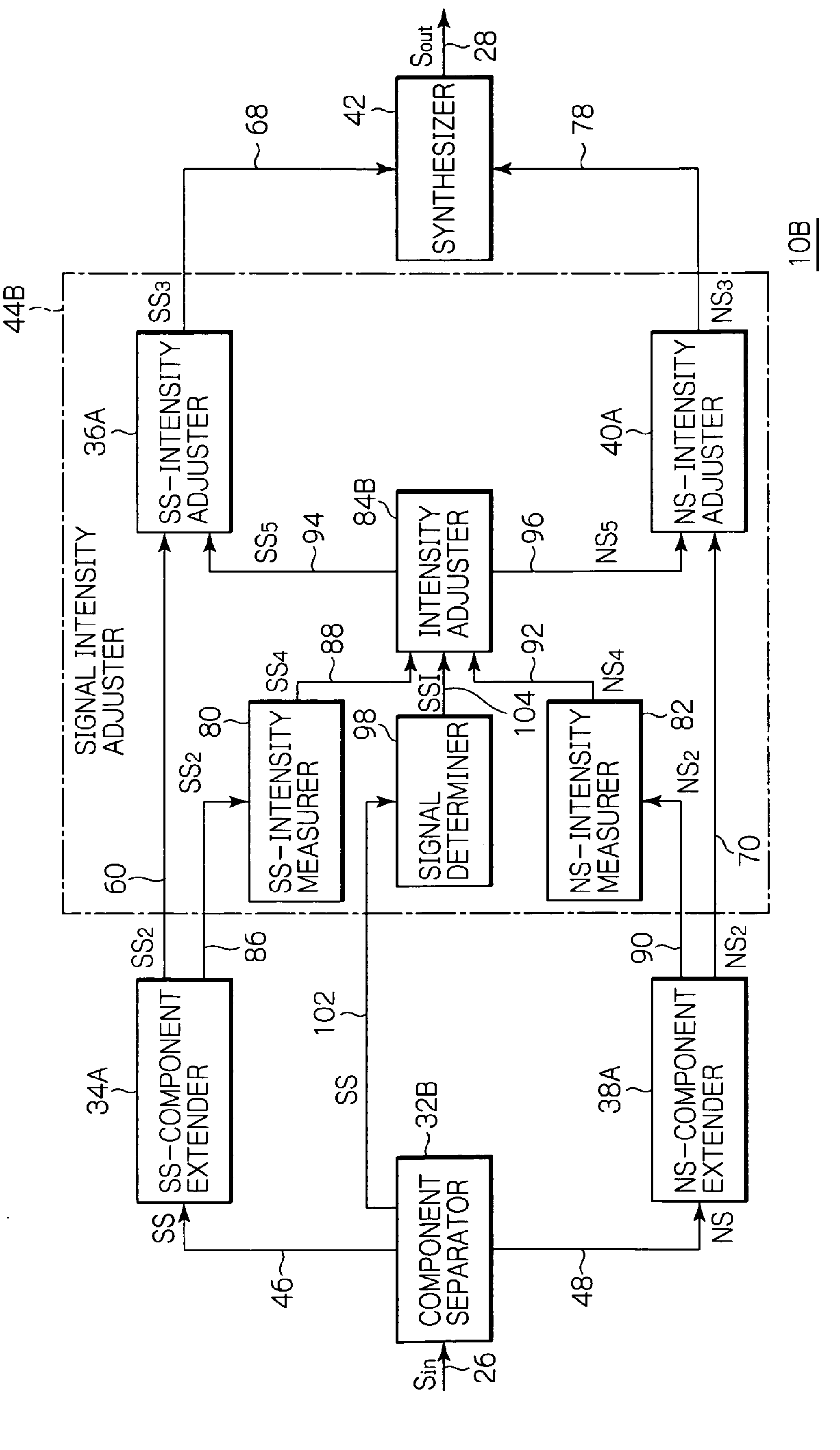
FIG. 12 is a schematic block diagram showing the internal configuration of a voice band extender according to a yet alternative embodiment.

In the following, a yet alternative embodiment of the voice band extender will be described in detail by appropriately referring to some figures. FIG. 12 is a schematic block diagram of the internal configuration of a voice band extender 10B of the yet alternative embodiment. The voice band extender 10B comprises a signal intensity adjuster 44B, which may be similar to the signal intensity adjuster 44A of the voice band extender 10A shown in FIG. 9. The voice extender 10B further comprises a component separator 32B, of which the operation partly differs from that of the signal component separator 32 of the embodiment shown in FIG. 9. The signal intensity adjuster 44B also comprises a signal determiner 98 for determining whether or not the signal SS contains the characteristic component of voice, as well as an intensity adjuster 84B for adjusting the values of intensity adjustment of input signals.

The component separator 32B is configured to separate a noise-suppressed signal SS from an input speech signal $S_{in}$ in the same manner as the component separator 32 of the embodiment shown in FIG. 9, and output the noise-suppressed signal SS to the determiner 98. The remaining processes executed by the component separator 32B may substantively be similar to those of the component separator 32 shown in FIG. 9. A repetitive description thereon will therefore be refrained from for the sake of simplification.

The signal determiner 98 has its input 102 connected to the component separator 32B and is adapted to perform a signal determination on the received noise-suppressed signal SS to produce signal determination result information SSI on a result from the determination. The determiner 98 has its output 104 interconnected to the intensity adjuster 84B to supply the information SSI to the intensity adjuster 84B. The operation of the signal determiner 98 will be described below.

The signal determiner 98 separates the noise-suppressed signal SS at a predetermined time interval, such as each 25 ms, from the incoming speech signal $S_{in}$, and stores the resultant signal SS in the memory 30. The signal determiner 98 uses an autocorrelation function to calculate, at the predetermined time interval, a delay time at which the peak amplitude of the signal SS becomes the maximum level, i.e. the maximum delay time. If the maximum delay time is within a predetermined range, e.g. 0.5 to 10 ms, then the signal determiner 98 determines that the signal SS contains the characteristic component of voice consisting of a voiced or unvoiced sound component of a voice sound produced by the talker, the user $U_1$ in this example. The predetermined range may be so defined by a designer's choice that the optimum quality of output voice sound can be obtained. This signal determination allows a period of time, during which the user $U_1$ did not speak, to be decided by determining whether or not the signal SS separated from the input speech signal $S_{in}$ contains a characteristic component of voice.

The signal determination result information SSI output from the determiner 98 includes a result of the aforementioned signal determination, e.g. in the form of flag. For instance, if the determination result shows that the noise-suppressed signal SS contains a characteristic component of voice, the flag may be set to a binary value "1", and otherwise to a binary value "0".

The intensity adjuster 84B has its three inputs 88, 92 and 104 connected to the noise-suppressed signal intensity measurer 80, the extracted-noise signal intensity measurer 92 and the determiner 98, respectively, to receive the noise-suppressed signal intensity information $SS_4$ from the intensity measurer 80, the extracted-noise signal intensity information $NS_4$ from the intensity measurer 82 and the signal determination result information SSI from the determiner 98.

The intensity adjuster 84B firstly uses the signal determination result information SSI to determine whether or not the noise-suppressed signal SS includes a characteristic component of voice. When the information SSI indicates that the noise-suppressed signal SS includes the characteristic component of voice, the intensity adjuster 84B carries out the similar procedure to the procedure performed by the intensity adjuster 84 in the previous embodiment.

In contrast, when the information SSI indicates that the signal SS does not include any characteristic component of voice, the intensity adjuster 84B feeds the noise-suppressed signal intensity adjuster 36A with the noise-suppressed signal intensity adjustment information $SS_5$ which includes an instruction to cause the adjuster 36A to output the adjusted noise-suppressed signal $SS_3$ indicative of the signal intensity "0".

The intensity adjuster 84B thus serves as a sort of generator for producing, when the maximum delay time is within the predetermined time period, the noise-suppressed signal intensity adjustment information for setting the intensity of the extended extracted-noise signal to approximately zero.

Now, the operation of the voice band extender 10B according to the yet alternative embodiment will be described with reference to FIGS. 12 to 15 and also to FIGS. 10 and 11 appropriately. The voice band extender 10B does not execute steps S102 to S108 in FIG. 10 done by the voice band extender 10A of the previous embodiment, but instead steps S402 to S406 shown in FIG. 13. The remaining steps S140-S146, S302-S326 and S156-S158 in FIGS. 10 and 11 are carried out also in the current embodiment, and the description thereof will not be repeated to avoid redundancy.

Figure 13:
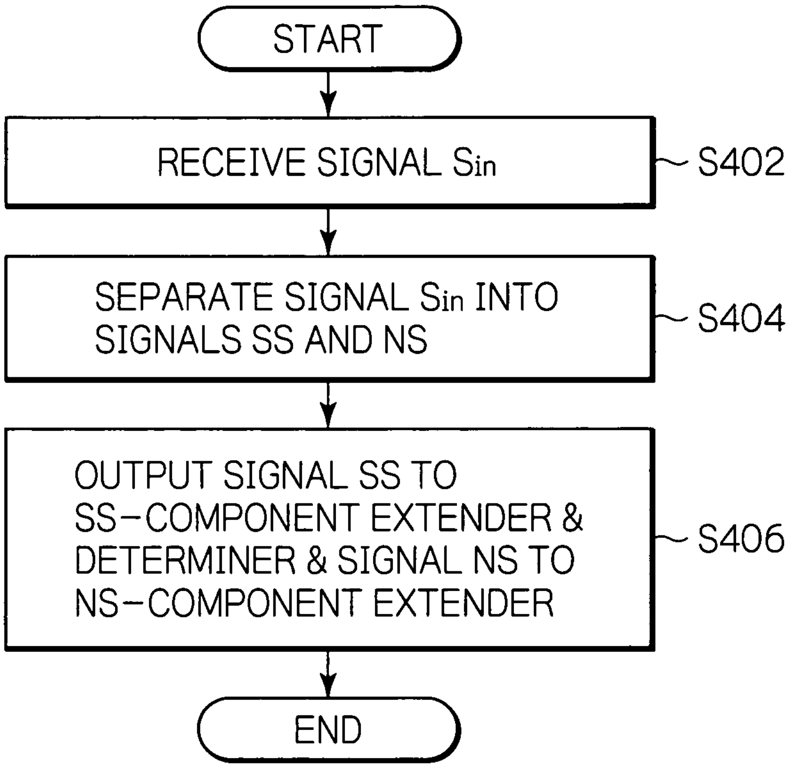
FIG. 13 is a flow chart useful for understanding an operation of the component separator shown in FIG. 12.

At first, the component separator 32B receives the input speech signal $S_{in}$ (step S402, FIG. 13). Next, the component separator 32B separates the signal $S_{in}$ into the noise-suppressed signal SS and the extracted-noise signal NS (step S404), and then supplies the signal SS to the determiner 98 as well as the noise-suppressed signal component extender 34A while supplying the signal NS to the extracted-noise signal component extender 38A (step S406).

Figure 14:
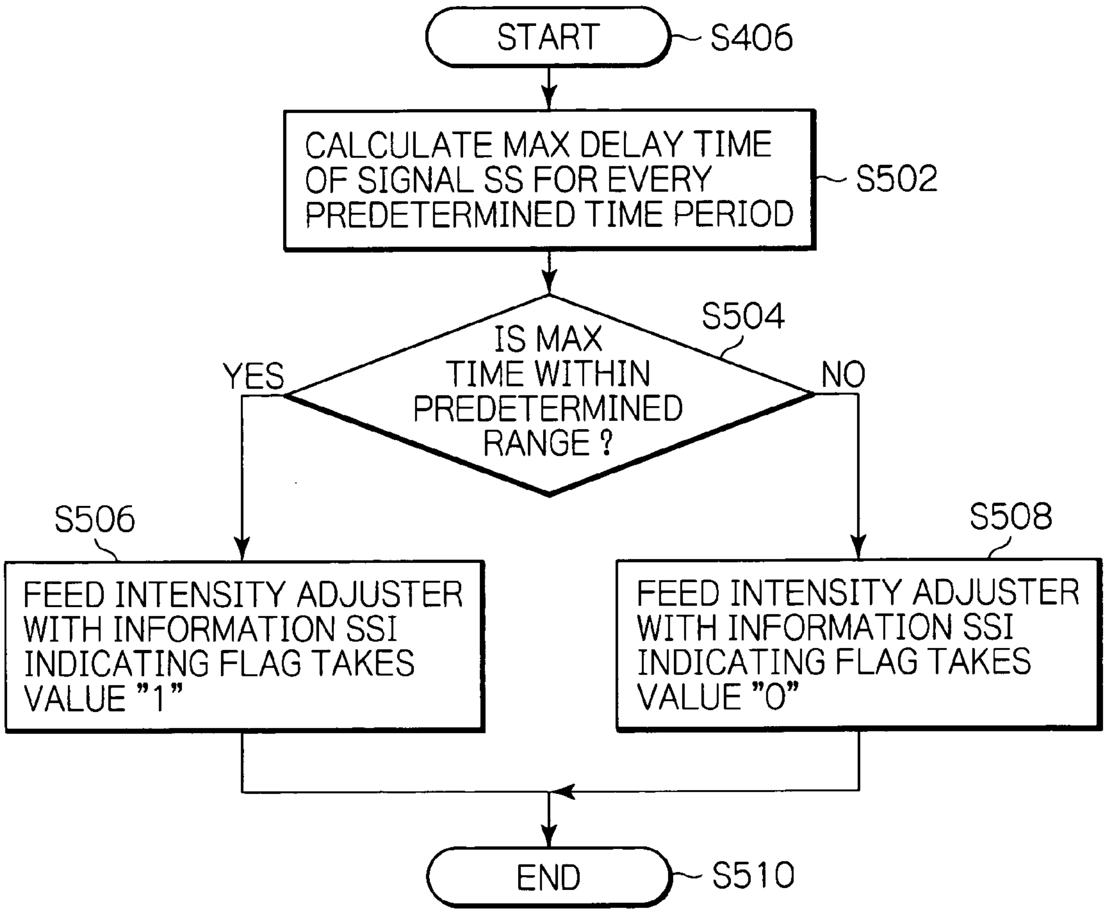
FIG. 14 is a flow chart useful for understanding an operation of the determiner shown in FIG. 12.

Upon receipt of the noise-suppressed signal SS from the component separator 32B in step S406, the signal determiner 98 calculates the maximum delay time of the noise-suppressed signal SS for every predetermined time period by using the autocorrelation function (step S502, FIG. 14). The determiner 98 then determines whether or not the maximum delay time falls within the predetermined range (step S504).

When the maximum delay time is within the predetermined range in step S504, or the determination result is Yes, the determiner 98 decides that the noise-suppressed signal SS contains the characteristic component of voice and produces the signal determination result information SSI including the flag indicative of the value "1" to feed it to the intensity adjuster 84B (step S506).

If the maximum delay time is out of the predetermined range in step S504, i.e. the determination result is No, then the determiner 98 decides that the noise-suppressed signal SS contains no characteristic component of voice and produces the signal determination result information SSI including the flag indicative of the value "0" to supply it to the intensity adjuster 84B (step S508). The determiner 98 thus ends the process of signal determination (step S510).

Figure 15:
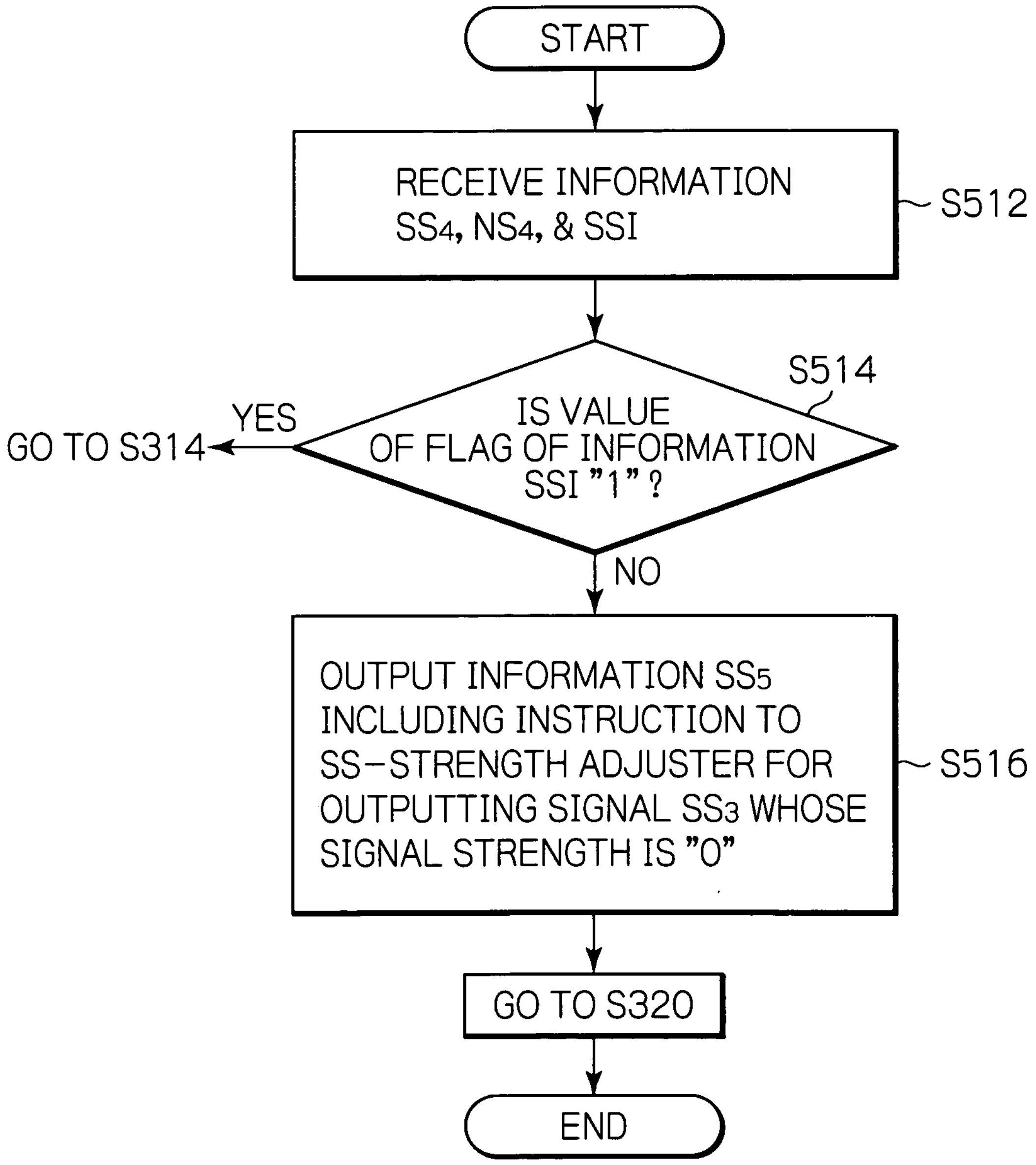
FIG. 15 is a flow chart useful for understanding an operation of the intensity adjuster shown in FIG. 12.

The intensity adjuster 84B receives the noise-suppressed signal intensity information $SS_4$ from the noise-suppressed signal intensity measurer 80, the extracted-noise signal intensity information $NS_4$ from the extracted-noise signal intensity measurer 82 and the signal determination result information SSI from the determiner 98 (step S512, FIG. 15). The receiving of the information SSI corresponds to the step S510 shown in FIG. 14. The intensity adjuster 84B then determines whether or not the information SSI includes the characteristic component of voice. In the instant alternative embodiment, the determination is made based on the value of the flag carried on the information SSI (step S514).

If the flag represents the value "1", that is, the information SSI indicates that the noise-suppressed signal SS contains the characteristic component of voice in step S514 (Yes), then the intensity adjuster 84B carries out, as with the intensity adjuster 84 of the previous embodiment, the step S314 and subsequent steps shown in FIG. 11.

When the flag represents the value "0", i.e. the signal determination result information SSI indicates that the noise-suppressed signal SS contains no characteristic component of voice in step S514 (No), the intensity adjuster 84B supplies the noise-suppressed signal intensity adjuster 36A with the noise-suppressed signal intensity adjustment information $SS_5$ which includes an instruction to cause the noise-suppressed signal intensity adjuster 36A to output the adjusted noise-suppressed signal $SS_3$ indicative of the signal intensity "0" (step S516).

The noise-suppressed signal intensity adjuster 36A in turn outputs the adjusted noise-suppressed signal $SS_3$ with its signal intensity adjusted to be "0" according to the contents of the noise-suppressed signal intensity adjustment information $SS_5$ (corresponding to steps S320 and S322, FIG. 11). The subsequent processes to be performed may be similar to step S324 and the steps subsequent thereto shown in FIG. 11, and therefore the description thereof will be repeated.

In summary, the voice band extender 10B of the instant alternative embodiment determines a period of time, during which the talker, such as the user $U_1$, did not speak, by determining whether or not the noise-suppressed signal SS separated from the input speech signal $S_{in}$ contains the characteristic component of voice consisting of a voiced sound component or an unvoiced sound component produced by the user $U_1$.

When the characteristic component of voice is not contained, the noise-suppressed signal intensity adjuster 36A outputs the adjusted noise-suppressed signal $SS_3$, of which the signal intensity is adjusted to be "0". The synthesizer 42 in turn supplies the voice converter 18 with the band-extended speech signal $S_{out}$ consisting only of the adjusted extracted-noise signal $NS_3$.

In this way, when the input speech signal $S_{in}$ is of a period of time during which the user $U_1$ did not speak, it is possible to avoid the noise-suppressed signal SS separated from the signal $S_{in}$ from being treated as a noise-free component even though the signal SS consists only of the noise component, thereby preventing the synthesizer 42 from outputting the band-extended speech signal $S_{out}$ in which the noise component is expanded. This instant embodiment also enjoys the advantages of the previous embodiments, the quality of voice sound being further improved.

The entire disclosure of Japanese patent application No. 2009-225572 filed on Sep. 29, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A voice band extender for receiving a band-limited speech signal over a telecommunications line to extend a frequency band of the speech signal, comprising:

a component separator for removing a noise component from a frequency component of the speech signal to form a noise-suppressed signal, and for removing a frequency component of the noise-suppressed signal from the frequency component of the speech signal to form an extracted-noise signal;

a noise-suppressed signal component extender for adding to the noise-suppressed signal a signal having a frequency band higher than a frequency band of the noise-suppressed signal to produce an extended noise-suppressed signal;

an extracted-noise signal component extender for adding to the extracted-noise signal a signal having a frequency band higher than a frequency band of the extracted-noise signal to produce an extended extracted-noise signal;

a signal intensity adjuster for adjusting signal intensity of at least one of the extended noise-suppressed signal and the extended extracted-noise signal; and a synthesizer for combining the extended noise-suppressed signal and the extended extracted-noise signal with each other, at least one of which is adjusted by said signal intensity adjuster.

2. The voice band extender in accordance with claim 1, wherein said noise-suppressed signal component extender comprises a first band shifter for shifting the frequency band of the noise-suppressed signal to a higher range, a first signal combiner for combining the shifted noise-suppressed signal with the noise-suppressed signal before shifted to produce a first combined signal, and a first attenuator for attenuating the intensity of the first combined signal lying in the frequency band of the shifted noise-suppressed signal, a rate of attenuation being larger in a higher frequency region, said extracted-noise signal component extender comprising a second band shifter for shifting the frequency band of the extracted-noise signal to a higher range, a second signal combiner for combining the shifted extracted-noise signal with the extracted-noise signal before shifted to produce a second combined signal, and a second attenuator for attenuating the intensity of the combined signal lying in the frequency band of the shifted extracted-noise signal, a rate of attenuation being larger in a higher frequency region.

3. The voice band extender in accordance with claim 1, wherein said signal intensity adjuster comprises:

a noise-suppressed signal intensity adjuster for adjusting the signal intensity of the entire extended noise-suppressed signal such that a maximum signal intensity of the extended noise-suppressed signal is substantially equal to a predetermined value; and an extracted-noise signal intensity adjuster for adjusting the signal intensity of the entire extended extracted-noise signal such that a maximum signal intensity of the extended extracted-noise signal is substantially smaller than the predetermined value.

4. The voice band extender in accordance with claim 1, wherein said signal intensity adjuster comprises:

a noise-suppressed signal intensity measurer for measuring the intensity of the extended noise-suppressed signal;

an extracted-noise signal intensity measurer for measuring the intensity of the extended extracted-noise signal;

an extended noise-suppressed signal intensity adjuster for comparing the intensity of the extended noise-suppressed signal with the intensity of the extended extracted-noise signal to produce noise-suppressed signal intensity adjustment information and extracted-noise signal intensity adjustment information to be used to make the intensity of the extended extracted-noise signal lower than the intensity of the extended noise-suppressed signal;

a noise-suppressed signal intensity adjuster for adjusting the intensity of the extended noise-suppressed signal based on the noise-suppressed signal intensity adjustment information; and an extracted-noise signal intensity adjuster for adjusting the intensity of the extended extracted-noise signal based on the extracted-noise signal intensity adjustment information.

5. The voice band extender in accordance with claim 4, further comprising a determiner for using an autocorrelation function to calculate a maximum delay time of the noise-suppressed signal, at which a peak amplitude is largest, and determining whether or not the maximum delay time is within a predetermined time period, said extended noise-suppressed signal intensity adjuster producing, when the maximum delay time is within the predetermined time period, the noise-suppressed signal intensity adjustment information for setting the intensity of the extended extracted-noise signal to approximately zero.

6. A voice band extension program, when installed and executed on a computer, for controlling the computer to serve as a voice band extender that receives a band-limited speech signal over a telecommunications line to extend a frequency band of the speech signal, said voice band extender including:

a component separator for removing a noise component from a frequency component of the speech signal to form a noise-suppressed signal, and removing a frequency component of the noise-suppressed signal from the frequency component of the speech signal to form an extracted-noise signal;

a noise-suppressed signal component extender for adding to the noise-suppressed signal a signal having a frequency band higher than a frequency band of the noise-suppressed signal to produce an extended noise-suppressed signal;

an extracted-noise signal component extender for adding to the extracted-noise signal a signal having a frequency band higher than a frequency band of the extracted-noise signal to produce an extended extracted-noise signal;

a signal intensity adjuster for adjusting signal intensity of at least one of the extended noise-suppressed signal and the extended extracted-noise signal; and a synthesizer for combining the extended noise-suppressed signal and the extended extracted-noise signal with each other, at least one of which is adjusted by said signal intensity adjuster.

7. The program in accordance with claim 6, controlling:

said noise-suppressed signal component extender to act as a first band shifter for shifting the frequency band of the noise-suppressed signal to a higher range, a first signal combiner for combining the shifted noise-suppressed signal with the noise-suppressed signal before shifted to produce a first combined signal, and a first attenuator for attenuating the intensity of the first combined signal lying in the frequency band of the shifted noise-suppressed signal, a rate of attenuation being larger in a higher frequency region; and said extracted-noise signal component extender to act as a second band shifter for shifting the frequency band of the extracted-noise signal to a higher range, a second signal combiner for combining the shifted extracted-noise signal with the extracted-noise signal before shifted to produce a second combined signal, and a second attenuator for attenuating the intensity of the combined signal lying in the frequency band of the shifted extracted-noise signal, a rate of attenuation being larger in a higher frequency region.

8. The program in accordance with claim 6, controlling said signal intensity adjuster to act as:

a noise-suppressed signal intensity adjuster for adjusting the signal intensity of the entire extended noise-suppressed signal such that a maximum signal intensity of the extended noise-suppressed signal is substantially equal to a predetermined value; and an extracted-noise signal intensity adjuster for adjusting the signal intensity of the entire extended extracted-noise signal such that a maximum signal intensity of the extended extracted-noise signal is substantially smaller than the predetermined value.

9. The program in accordance with claim 6, controlling said signal intensity adjuster to act as:

a noise-suppressed signal intensity measurer for measuring the intensity of the extended noise-suppressed signal;

an extracted-noise signal intensity measurer for measuring the intensity of the extended extracted-noise signal;

an extended noise-suppressed signal intensity adjuster for comparing the intensity of the extended noise-suppressed signal with the intensity of the extended extracted-noise signal to produce noise-suppressed signal intensity adjustment information and extracted-noise signal intensity adjustment information to be used to make the intensity of the extended extracted-noise signal lower than the intensity of the extended noise-suppressed signal;

a noise-suppressed signal intensity adjuster for adjusting the intensity of the extended noise-suppressed signal based on the noise-suppressed signal intensity adjustment information; and an extracted-noise signal intensity adjuster for adjusting the intensity of the extended extracted-noise signal based on the extracted-noise signal intensity adjustment information.

10. The program in accordance with claim 9, wherein said voice band extender further includes a determiner for using an autocorrelation function to calculate a maximum delay time of the noise-suppressed signal, at which a peak amplitude is largest, and determining whether or not the maximum delay time is within a predetermined time period, said program controlling said extended noise-suppressed signal intensity adjuster to act as a generator for producing, when the maximum delay time is within the predetermined time period, the noise-suppressed signal intensity adjustment information for setting the intensity of the extended extracted-noise signal to approximately zero.

* * * * *